US009657159B2

(12) United States Patent
Yamamoto et al.

(10) Patent No.: US 9,657,159 B2
(45) Date of Patent: May 23, 2017

(54) POLYAMIDE RESIN COMPOSITION

(71) Applicant: MITSUBISHI GAS CHEMICAL COMPANY, INC., Tokyo (JP)

(72) Inventors: Takashi Yamamoto, Kanagawa (JP); Jun Mitadera, Kanagawa (JP); Ryoji Otaki, Kanagawa (JP); Tomonori Kato, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/797,659

(22) Filed: Jul. 13, 2015

(65) Prior Publication Data

US 2015/0315357 A1 Nov. 5, 2015

Related U.S. Application Data

(62) Division of application No. 13/698,143, filed as application No. PCT/JP2011/060846 on May 11, 2011, now abandoned.

(30) Foreign Application Priority Data

May 17, 2010 (JP) ................................ 2010-113028
Jul. 27, 2010 (JP) ................................ 2010-168081

(51) Int. Cl.
| C08K 5/098 | (2006.01) |
| C08L 77/06 | (2006.01) |
| C08K 5/101 | (2006.01) |
| C08K 3/34 | (2006.01) |
| B32B 1/02 | (2006.01) |
| B32B 27/08 | (2006.01) |
| B32B 27/34 | (2006.01) |
| C08G 69/26 | (2006.01) |
| C08G 69/28 | (2006.01) |
| C08J 3/22 | (2006.01) |
| C08K 3/32 | (2006.01) |

(52) U.S. Cl.
CPC .............. C08K 5/101 (2013.01); B32B 1/02 (2013.01); B32B 27/08 (2013.01); B32B 27/34 (2013.01); C08G 69/26 (2013.01); C08G 69/265 (2013.01); C08G 69/28 (2013.01); C08J 3/226 (2013.01); C08K 3/32 (2013.01); C08K 3/34 (2013.01); C08K 5/098 (2013.01); C08L 77/06 (2013.01); C08J 2377/06 (2013.01); C08J 2477/00 (2013.01); Y10T 428/1383 (2015.01); Y10T 428/31736 (2015.04)

(58) Field of Classification Search
CPC ............ C08K 3/34; C08K 5/098; C08L 77/06
See application file for complete search history.

(56) References Cited

U.S. PATENT DOCUMENTS

| 3,872,055 | A | | 3/1975 | Furukawa et al. | |
| 5,116,919 | A | | 5/1992 | Buzinkai et al. | |
| 6,166,171 | A | * | 12/2000 | Yamamoto | C08G 69/30 428/220 |
| 6,303,741 | B1 | | 10/2001 | Tanaka | |
| 6,841,651 | B2 | * | 1/2005 | Maruo | C08G 69/02 428/34.1 |
| 7,807,742 | B2 | * | 10/2010 | Tanaka | C08G 69/26 524/140 |
| 8,993,655 | B2 | | 3/2015 | Yamamoto | |
| 2006/0270799 | A1 | | 11/2006 | Sato et al. | |
| 2010/0120961 | A1 | | 5/2010 | Tanaka et al. | |
| 2010/0206762 | A1 | | 8/2010 | Sasai et al. | |
| 2013/0065005 | A1 | | 3/2013 | Yamamoto et al. | |

FOREIGN PATENT DOCUMENTS

| CN | 101163746 A | 4/2008 |
| CN | 101678935 A | 3/2010 |
| EP | 2 025 718 | 2/2009 |
| JP | 49 38950 | 4/1974 |
| JP | 49 45960 | 5/1974 |
| JP | 7-238222 A | 9/1995 |
| JP | 2000 234021 | 8/2000 |
| JP | 2001 164109 | 6/2001 |
| JP | 2005 194328 | 7/2005 |

(Continued)

OTHER PUBLICATIONS

Machine translation of JP 2010-159334 A, Jul. 22, 2010.*
U.S. Appl. No. 14/821,484, filed Aug. 7, 2015, Yamamoto, et al.
Office Action issued Jan. 25, 2016 in Vietnamese Patent Application No. 1-2012-03404 (with English language translation).
U.S. Pat. No. 8,993,655, filed Mar. 31, 2015, Yamamoto.
U.S. Appl. No. 13/698,222, filed Nov. 15, 2012, Yamamoto, et al.
Combined Office Action and Search Report issued on Jul. 27, 2015 in Taiwanese Patent Application No. 100116740 with English translation of category of cited documents.

(Continued)

Primary Examiner — Vickey Nerangis
(74) Attorney, Agent, or Firm — Oblon, McClelland, Maier & Neustadt, L.L.P.

(57) ABSTRACT

The present invention relates to a polyamide resin composition comprising polyamide (X) comprising a diamine unit containing 70 mol % or more of a metaxylylenediamine unit and a dicarboxylic acid unit and an alkali compound (A), wherein the following equations (1) to (4) are satisfied:

$$10 \leq ([COOH]-[NH_2]) \leq 80 \quad (1)$$

$$0.32 \leq P < 6.46 \quad (2)$$

$$0.50 \leq M < 17.00 \quad (3)$$

$$2 \leq M/P \leq 3 \quad (4)$$

wherein [COOH] represents a concentration (μeq/g) of a terminal carboxyl group in the polyamide (X); [NH$_2$] represents a concentration (μeq/g) of a terminal amino group in the polyamide (X); P represents a mole concentration (μmol/g) of a phosphorus atom contained per g of the polyamide resin composition; and M represents a sum (μmol/g) of values obtained by multiplying a mole concentration of an alkali metal atom and a mole concentration of an alkaline earth metal atom each contained per g of the polyamide resin composition by valencies thereof respectively.

13 Claims, No Drawings

(56) References Cited

FOREIGN PATENT DOCUMENTS

| | | |
|---|---|---|
| JP | 2005 194330 | 7/2005 |
| JP | 3808847 | 8/2006 |
| JP | 2007 31475 | 2/2007 |
| JP | 2007 92053 | 4/2007 |
| JP | 2007 92054 | 4/2007 |
| JP | 2007 177208 | 7/2007 |
| JP | 2008-56841 A | 3/2008 |
| JP | 2008-308512 A | 12/2008 |
| JP | 2010159334 A * | 7/2010 |
| TW | 418222 B | 1/2001 |
| WO | 2008 126745 | 10/2008 |

International Search Report Issued Aug. 2, 2011 in PCT/JP11/60846 Filed May 11, 2011.
Office Action issued Mar. 31, 2015, in corresponding Russian Patent Application No. 2012154320/05 (086217) (with English-language Translation).

* cited by examiner

POLYAMIDE RESIN COMPOSITION

TECHNICAL FIELD

The present invention relates to a polyamide resin composition, specifically to a polyamide resin composition which is industrially useful as a packaging material and a material for fibers.

BACKGROUND ART

Polyamide having a metaxylylene group in a polymer principal chain has a high rigidity and is widely used as a molding material, and in addition thereto, it is excellent as well in a performance of cutting off oxygen, carbon dioxide and the like and is also used as a gas-barrier material for various packaging materials such as bottles, sheets, films and the like. Particularly in polyamide used for applications such as bottles, sheets, films, fibers and the like, attentions are paid to mixing of foreign matters. Due to that the molded and processed products are transparent and thin, that a high level and delicate mold processing technology is required and that foreign matters are very highly likely to damage the performances of the molded and processed products, mixing of foreign matters brings about the inferior appearance, an increase in a rate of generating defects such as breaking and the like attributable to foreign matter-generating sites and a reduction in the productivity.

Foreign matters originating in polyamide include powders called a fine, thin films called a froth, yellowed matters and carbides produced by thermal degradation and gelatinous matters. It is the best countermeasure to inhibit the above foreign matters from being produced, but when they are inevitably produced, they have to be separated and removed from the pelletized products. The powders and the thin films are usually removed by wind selection, and the yellowed matters and the carbides can be removed by a screening equipment using an optical sensor. Various separating equipments are commercially available, and the sure removing effects can be expected.

On the other hand, gels are estimated to be produced due to that the molecules are damaged (the polymer molecules are degraded by radicals generated) during polymerization and mold processing to bring about abnormal reactions (turned into three-dimensional polymers) such as growing of non-linear molecules and the like and that they are turned into an extremely high molecular weight as compared with those of other polyamide molecules. Accordingly, a thermal history has to be reduced to the utmost in the production step in order to obtain polyamide containing less gel, and measurements such as adding a heat stabilizer or an antioxidant are carried out. However, some of the above additives show a catalytic effect to amidation reaction, and on the contrary, they expedite excessively polymerization reaction to bring about an increase in gels in a certain case. Accordingly, the reaction is carried out usually while maintaining a balance between promotion and inhibition of the reaction by adding a specific amount of an alkali compound having further a reaction inhibitory effect.

Gels produced in a melt polymerization step can be removed by a filter and the like, but the gels are turned into fine particles by a flow pressure and pass through the filter in many cases. Further, gels are likely to be produced as well in solid phase polymerization carried out in producing high viscosity products, and therefore it is almost impossible to completely remove them.

Further, gels can be produced as well in melting in mold processing other than during production of polyamide. Even when used is polyamide in which a marked difference in a production amount of gels is not observed in evaluating a quality of the polyamide after production thereof, the difference is exerted in a certain case in mold processing, and a cause thereof is estimated to be attributable to that an excessive thermal history is applied to a part of the polymer in staying parts thereof such as screw grooves, a filter, a die and the like in mold processing. Further, if a polyamide resin stays in an inside of a molding machine for a long time in molding a bottle, a degraded matter of the resin is turned into burnt deposits, and they are mixed in the product to deteriorate a yield of the product, or the burnt deposits clog flow channels in an inside of the molding machine to make it impossible to carry out the molding in a certain case. When burnt deposits are generated, it is necessary to use a purging agent or to disassemble and clean the die, and the stable production is prevented. It can be found from the above matters that it is important for obtaining finally mold processed articles having less gel and burnt deposit to produce polyamide having further less gel and a higher grade and design a mold processing apparatus having very small staying parts.

It is necessary for producing polyamide having further less gel to inhibit a thermal history in the production, control a balance between addition of an effective stabilizer and an amount thereof and remove gels produced as well in melt polymerization and solid phase polymerization, but the effects thereof have been limited. Further, in designing a mold processing apparatus, it is possible to reduce production of gels by subjecting, for example, metal parts which are brought into contact with the resin to plating treatment, but it is difficult in terms of constitution of the apparatus to completely eliminate the staying parts. Further, the respective molding apparatuses have to be subjected to the treatment, and it is lacking in the possibility thereof in terms of the versatility and the cost. Particularly in polyamide comprising a diamine component in which xylylenediamine is a principal component, radicals are liable to be produced in a benzylmethylene site of xylylenediamine, and production of gels provides more serious problems than in other polyamides.

Patent document 1 discloses a method in which at least one selected from a lubricant, an organic phosphorus base stabilizer, a hindered phenol compound and a hindered amine compound is added in an amount of 0.0005 to 0.5 parts by mass in mold and processing polyamide to thereby inhibit gels from being produced.

Patent document 2 discloses a method in which fish eyes are inhibited from being produced in mold processing by adding 0.001 to 0.015 parts by mass of a metal salt of a higher fatty acid and a polyhydric alcohol compound in order to enhance a lubricity of polyamide to inhibit shearing heat from being generated in the mold processing.

Patent document 3 discloses a method in which 50 to 1,000 ppm by weight of a phosphinic acid compound or a phosphonous acid compound and 1 to 5 mole times of an alkali compound based on a concentration of phosphorus atoms contained are added to thereby inhibit gels from being produced.

Patent documents 4 and 5 disclose methods in which a phosphorus base compound and an alkali metal salt are added in a fixed balance to thereby inhibit a back pressure of a filter from being elevated by a phosphorus-modified product and inhibit gels from being produced.

Patent documents 6 and 7 disclose methods in which the amounts of pyrophosphoric acid and other phosphorus base compounds contained in polyamide are controlled to thereby inhibit a back pressure of a filter from being elevated by a phosphorus-modified product and inhibit gels from being produced.

CITATION LIST

Patent Documents

[Patent document 1] JP-A-2001-164109
[Patent document 2] JP-B-3808847
[Patent document 3] JP-A-49-38950
[Patent document 4] JP-A-2005-194328
[Patent document 5] JP-A-2005-194330
[Patent document 6] JP-A-2007-92053
[Patent document 7] JP-A-2007-92054

SUMMARY OF INVENTION

Technical Problem

However, the method described in Patent document 1 is short of effects when the results described in the examples are observed in terms of a practical aspect, and specific grounds for inhibiting gels from being produced in the respective additives are scarcely referred to. Further, it is not at all described in Patent document 2 that a change itself in a quality of polyamide is inhibited. A method for determining a gel production amount in Patent document 3 is unsatisfactory in imitation of an actual mold processing environment, and in fact, production of gels can not be sufficiently inhibited by the method described in Patent document 3. In Patent documents 4 to 7, the phosphorus base compound and the alkali metal salt are described within the limit of adding them in the melt polymerization, and production of gels in mold processing can not be sufficiently inhibited by these methods. Furthermore, some methods in which gels or fish eyes are inhibited from being produced in mold processing have been studied from viewpoint of a material, but a useful method in which burnt deposits are inhibited from being produced in molding a bottle have not been discovered.

A problem to be solved by the present invention is to provide a polyamide resin composition which has a good color tone and which produces less gel and burnt deposit in mold processing, a production process for the same, and a multilayer molded article prepared by using the above polyamide resin composition.

Solution to Problem

The present invention provides a polyamide resin composition, a production process for the same and a multilayer molded article each shown below.

[1] A polyamide resin composition comprising polyamide (X) comprising a diamine unit containing 70 mol % or more of a metaxylylenediamine unit and a dicarboxylic acid unit and an alkali compound (A), wherein the following equations (1) to (4) are satisfied:

$10 \leq ([COOH]-[NH_2]) \leq 80$ (1)

$0.32 \leq P < 6.46$ (2)

$0.50 \leq M < 17.00$ (3)

$2 \leq M/P \leq 3$ (4)

wherein [COOH] represents a concentration (μeq/g) of a terminal carboxyl group in the polyamide (X); [NH$_2$] represents a concentration (μeq/g) of a terminal amino group in the polyamide (X); P represents a mole concentration (μmol/g) of a phosphorus atom contained per g of the polyamide resin composition; and M represents a sum (μmol/g) of values obtained by multiplying a mole concentration of an alkali metal atom and a mole concentration of an alkaline earth metal atom each contained per g of the polyamide resin composition by valencies thereof respectively.

[2] A production process for the polyamide resin composition according to the above item [1], comprising:

(a) a step in which diamine containing 70 mol % or more of metaxylylenediamine and dicarboxylic acid are subjected to polycondensation under the presence of a phosphorus atom-containing compound (B) to obtain polyamide (X) and (b) a step in which an alkali compound (A) is added to the polyamide (X) obtained in the step (a) described above.

[3] A multilayer molded article comprising an outermost layer, an innermost layer and at least one gas-barrier layer between the outermost layer and the innermost layer, wherein the outermost layer and the innermost layer are constituted from a polyester resin comprising a dicarboxylic acid unit containing 80 mol % or more of a terephthalic acid unit and a diol unit containing 80 mol % or more of an ethylene glycol unit, and the gas-barrier layer is constituted from the polyamide resin composition according to the above item [1].

Advantageous Effects of Invention

According to the present invention, a polyamide resin composition which has a good color tone and which produces less gelatinous substance in production and mold processing can be provided. Further, the multilayer molded article of the present invention contains less burnt deposit and has a very high industrial value as a multilayer bottle and the like.

DESCRIPTION OF EMBODIMENTS

The polyamide resin composition of the present invention comprises polyamide (X) comprising a diamine unit containing 70 mol % or more of a metaxylylenediamine unit and a dicarboxylic acid unit and an alkali compound (A), wherein the following equations (1) to (4) are satisfied:

$10 \leq ([COOH]-[NH_2]) \leq 80$ (1)

$0.32 \leq P < 6.46$ (2)

$0.50 \leq M < 17.00$ (3)

$2 \leq M/P \leq 3$ (4)

wherein [COOH] represents a concentration (μeq/g) of a terminal carboxyl group in the polyamide (X); [NH$_2$] represents a concentration (μeq/g) of a terminal amino group in the polyamide (X); P represents a mole concentration (μmol/g) of a phosphorus atom contained per g of the polyamide resin composition; and M represents a sum (μmol/g) of values obtained by multiplying a mole concentration of an alkali metal atom and a mole concentration of an alkaline earth metal atom each contained per g of the polyamide resin composition by valencies thereof respectively.

The alkali compound is used, as described above, as a neutralizing agent for a phosphorus base compound added in the polymerization. However, a use amount thereof in the polymerization of the polyamide is limited from the viewpoint of a balance with the phosphorus base compound. The inventors of the present invention have made earnest studies, and as a result, found that gels can be inhibited from being produced in mold processing by adding the alkali compound in the mold processing after polymerizing the polyamide to elevate a concentration thereof and allowing an end group concentration of the polyamide, a phosphorus atom concentration and an alkali metal atom concentration to fall in specific numerical value ranges; an amount of gels produced is small even if a staying situation of the molten polyamide continues over a long period of time; and the resulting molded article is decreased in gels and coloring and has a good appearance. The present invention has been completed based on the above findings.

<Polyamide (X)>

The diamine unit constituting the polyamide (X) contains 70 mol % or more of the metaxylylenediamine unit, and it contains preferably 80 mol % or more, more preferably 90 mol % or more. If the metaxylylenediamine unit in the diamine unit accounts for 70 mol % or more, the polyamide (X) can exert an excellent gas-barrier property. Further, the polyamide (X) exerts characteristics excellent in a co-injection moldability and a co-stretching blow moldability with a polyester resin (principally polyethylene terephthalate) and has a good formability.

Capable of being shown as the examples of compounds other than the metaxylylenediamine unit which can constitute the diamine are aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, 2,4,4-trimethyl-hexamethylenediamine and the like; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, bis(aminomethyl)tricyclodecane and the like; and diamines having aromatic rings, such as bis(4-aminophenyl) ether, paraphenylenediamine, paraxylylenediamine, bis(aminomethyl)naphthalene and the like. However, they shall not be restricted to the above compounds.

Capable of being shown as the examples of compounds which can constitute the dicarboxylic acid unit constituting the polyamide (X) are aliphatic dicarboxylic acids such as succinic acid, glutaric acid, pimelic acid, adipic acid, suberic acid, azelaic acid, sebacic acid, undecandioic acid, dodecanedioic acid, dimer acid and the like; alicyclic dicarboxylic acids such as 1,4-cyclohexanedicarboxylic acid and the like; and aromatic dicarboxylic acids such as terephthalic acid, isophthalic acid, orthophthalic acid, xylylenedicarboxylic acid, naphthalenedicarboxylic acid and the like. However, they shall not be restricted to the above compounds. Among them, adipic acid and sebacic acid are preferred.

Polyamide comprising a diamine unit containing 70 mol % or more of a metaxylylenediamine unit and a dicarboxylic acid unit containing 70 mol % or more, preferably 80 mol % or more and more preferably 90 mol % or more of an adipic acid unit can be shown as the example of the polyamide (X) which can be preferably used in the present invention. If 70 mol % or more of the adipic acid is contained in the dicarboxylic acid unit, a reduction in the gas-barrier property and an excessive reduction in the crystallinity can be avoided. At least one of α,ω-linear aliphatic dicarboxylic acids having 4 to 20 carbon atoms is preferably used as a compound which can constitute the dicarboxylic acid unit other than the adipic acid unit.

Further, polyamide comprising a diamine unit containing 70 mol % or more of a metaxylylenediamine unit and a dicarboxylic acid unit containing 70 to 99 mol % of an adipic acid unit and 1 to 30 mol % of an isophthalic acid unit can also be shown as the example of the polyamide (X) which can be preferably used in the present invention. Addition of the isophthalic acid unit as the dicarboxylic acid unit makes it possible to reduce the melting point and lower the mold processing temperature and therefore makes it possible to reduce a thermal history during molding the polyamide resin composition and inhibit gels and burnt deposits from being produced.

Further, polyamide comprising a diamine unit containing 70 mol % or more of a metaxylylenediamine unit and a dicarboxylic acid unit containing 70 mol % or more, preferably 80 mol % or more and more preferably 90 mol % or more of a sebacic acid unit can also be shown as the example of the polyamide (X) which can be preferably used in the present invention. If 70 mol % or more of the sebacic acid unit is contained in the dicarboxylic acid unit, a reduction in the gas-barrier property and an excessive reduction in the crystallinity can be avoided. In addition thereto, the melting point can be reduced, and the mold processing temperature can be lowered. Further, gels and burnt deposits can be inhibited from being produced. At least one of α,ω-linear aliphatic dicarboxylic acids having 4 to 20 carbon atoms is preferably used as a compound other than the sebacic acid unit which can constitute the dicarboxylic acid unit.

In addition to the diamines and the dicarboxylic acids each described above, lactams such as ε-caprolactam, laurolactam and the like, aliphatic aminocarboxylic acids such as aminocaproic acid, aminoundecanoic acid and the like and aromatic aminocarboxylic acids such as p-aminomethylbenzoic acid and the like can also be used as a copolymerization component for a component constituting the polyamide (X) as long as the effects of the present invention are not damaged.

From viewpoint of moldability in molding of multilayer molded articles, a number average molecular weight of the polyamide (X) is preferably 10,000 to 50,000, more preferably 15,000 to 45,000 and further preferably 20,000 to 40,000, and it is suitably selected according to the uses and the molding method of the polyamide resin composition. In a case where the fluidity of some extent is required in the production, for example, a case of the use such as a film and the like, a number average molecular weight of the polyamide (X) is preferably 20,000 to 30,000. In a case where the melt strength is required in the production, for example, a case of the use such as a sheet and the like, a number average molecular weight of the polyamide (X) is preferably 30,000 to 40,000.

A number average molecular weight of the polyamide (X) is calculated from the following equation (5):

$$\text{Number average molecular weight} = 2 \times 1{,}000{,}000/([\text{COOH}]+[\text{NH}_2]) \quad (5)$$

wherein [COOH] represents a concentration (μmol/g) of a terminal carboxyl group in the polyamide (X), and [NH$_2$] represents a concentration (μmol/g) of a terminal amino group in the polyamide (X).

In the present invention, a value calculated by dissolving the polyamide in a phenol/ethanol mixed solvent and neutralizing and titrating the resulting solution with a diluted hydrochloric acid aqueous solution is used for the terminal amino group concentration, and a value calculated by dissolving the polyamide in benzyl alcohol and neutralizing and titrating the resulting solution with a sodium hydroxide aqueous solution is used for the terminal carboxyl group concentration.

In an end group balance in the polyamide (X) in the present invention, that is, a balance between the terminal carboxyl group concentration [COOH] and the terminal amino group concentration [NH$_2$], the terminal carboxyl group concentration is higher than the terminal amino group concentration, and a difference ([COOH]—[NH$_2$]) between the terminal carboxyl group concentration [COOH] and the terminal amino group concentration [NH$_2$] is 10 to 80 µeq/g, preferably 20 to 70 µeq/g and more preferably 25 to 60 µeq/g.

To be theoretical, it is considered that the amide group production reaction velocity is the fastest when a value of [COOH]—[NH$_2$] is 0, so that the polymerization time in the melt state and the solid phase state is the shortest and that the damage of the polyamide molecule is controlled to the lowest limit. In fact, however, when a value of [COOH]—[NH$_2$] is less than 10 µeq/g, in other words, when the terminal amino group concentration is excessive, an increase in the viscosity which is considered to originate in reaction other than the amide group production reaction is brought about in the solid phase polymerization. Accordingly, staying of the resin is liable to be brought about in an inside of the flow channels in mold processing of the polyamide (X), and gels and burnt deposits are liable to be produced.

In the present invention, controlling a value of [COOH]—[NH$_2$] to 10 to 80 µeq/g makes it possible to maintain the amide group production reaction velocity to a practical velocity and shorten the polymerization time in the melt state and the solid phase state to such an extent that the polyamide molecule can be inhibited from being damaged. Further, production of gels and burnt deposits can be reduced in mold processing.

<Alkali Compound (A)>

The polyamide resin composition of the present invention contains the alkali compound (A) from the viewpoint of preventing gels and burnt deposits from being produced in the mold processing.

The preferred specific examples of the alkali compound (A) used in the present invention include hydroxides, hydrides, alkoxides, carbonates, hydrogencarbonates and carboxylates of alkali metals and alkaline earth metals, but they shall not specifically be restricted to the above compounds. The preferred specific examples of the alkali metals and the alkaline earth metals include sodium, potassium, lithium, rubidium, cesium, magnesium, calcium and the like.

The hydroxides of the alkali metals and the alkaline earth metals include, for example, lithium hydroxide, sodium hydroxide, potassium hydroxide, rubidium hydroxide, cesium hydroxide, magnesium hydroxide, calcium hydroxide and the like.

The hydrides of the alkali metals and the alkaline earth metals include, for example, lithium hydride, sodium hydride, potassium hydride and the like.

The alkali metal alkoxides and the alkaline earth metal alkoxides are preferably alkoxides having 1 to 4 carbon atoms and include, for example, sodium methoxide, potassium methoxide, lithium methoxide, magnesium methoxide, calcium methoxide, sodium ethoxide, potassium ethoxide, lithium ethoxide, magnesium ethoxide, calcium ethoxide, sodium t-butoxide, potassium t-butoxide, lithium t-butoxide, magnesium t-butoxide, calcium t-butoxide and the like.

The carbonates and the hydrogencarbonates of the alkali metals and the alkaline earth metals include, for example, sodium carbonate, sodium bicarbonate, potassium carbonate, potassium bicarbonate, lithium carbonate, calcium carbonate, magnesium carbonate, sodium hydrogencarbonate, calcium hydrogencarbonate and the like, and anhydrous salts and hydrate salts thereof can be used.

The carboxylates of the alkali metals and the alkaline earth metals are preferably carboxylates having 1 to 10 carbon atoms, and anhydrous salts and hydrate salts thereof can be used. The specific examples of the carboxylic acids include, for example, linear saturated fatty acids such as formic acid, acetic acid, propionic acid, butyric acid, valeric acid, caproic acid, enanthic acid, capric acid, pelargonic acid, lauric acid, myristic acid, palmitic acid, stearic acid, eicosanoic acid, behenic acid, montanic acid, triacontanoic acid and the like; fatty acid derivatives such as 12-hydroxystearic acid and the like; aliphatic dicarboxylic acids such as oxalic acid, fumaric acid, maleic acid, succinic acid, glutaric acid, adipic acid, pimelic acid, suberic acid, azelaic acid, sebacic acid, undecanedioic acid, dodecanedioic acid and the like; hydroxy acids such as glycolic acid, lactic acid, hydroxybutyric acid, tartaric acid, malic acid, citric acid, isocitric acid, mevalonic acid and the like; and aromatic carboxylic acids such as benzoic acid, terephthalic acid, isophthalic acid, orthophthalic acid, pyromellitic acid, trimellitic acid, xylylenedicarboxylic acid, naphthalenedicarboxylic acid and the like.

The alkali compound (A) used in the present invention may be used in a single kind of the compounds described above or in combination of two or more kinds thereof. Among the compounds described above, carboxylates having 10 or less carbon atoms of the alkali metal are preferred from the viewpoints of a dispersibility in the polyamide (X) and an effect of inhibiting gels and burnt deposits from being produced, and sodium acetate and sodium acetate trihydrate are more preferred from the viewpoints of an economical efficiency and an effect of inhibiting gels and burnt deposits from being produced. Further, sodium carbonate is preferred as well, and sodium carbonate decahydrate is more preferred. In particular, sodium acetate trihydrate and sodium carbonate decahydrate are preferred since they have a low melting point and are improved in a dispersibility in the polyamide (X).

<Phosphorus Atom-Containing Compound (B)>

The phosphorus atom-containing compound (B) is used in the production of the polyamide (X) from the viewpoints of enhancing the processing stability in the melt processing and preventing the polyamide (X) from being colored. Accordingly, a phosphorus component is contained in the polyamide resin composition of the present invention.

The preferred specific examples of the phosphorus atom-containing compound (B) include hypophosphorous acid compounds (called as well phosphinic acid compounds or phosphinous acid compounds), phosphorous acid compounds (called as well phosphonic acid compounds) and the like, but they shall not specifically be restricted to the above compounds. The phosphorus atom-containing compound (B) may be metal salts or alkali metal salts.

The specific examples of the hypophosphorous acid compounds include hypophosphorous acid; hypophosphorous acid metal salts such as sodium hypophosphite, potassium hypophosphite, lithium hypophosphite and the like; hypophosphorous acid compounds such as ethyl hypophosphite, dimethyl phosphinate, phenyl methyl phosphinate, phenyl phosphinate, ethyl phenylphosphinate and the like; phenylphosphinous acid metal salts such as sodium phenylphosphinate, potassium phenylphosphinate, lithium phenylphosphinate and the like.

The specific examples of the phosphorous acid compounds include phosphorous acid and pyrophosphoric acid; phosphorous acid metal salts such as sodium hydrogenphosphite, sodium phosphite and the like; phosphorous acid compounds such as triethyl phosphite, triphenyl phosphite, ethylphosphonic acid, phenylphosphonic acid, diethyl phenylphosphonate and the like; phenylphosphonic acid metal salts such as sodium ethylphosphonate, potassium ethylphosphonate, sodium phenylphosphonate, potassium phenylphosphonate, lithium phenylphosphonate and the like.

The phosphorus atom-containing compound (B) may be used in a single kind of the compounds described above or in combination of two or more kinds thereof. Among the compounds described above, hypophosphorous acid metal salts such as sodium hypophosphite, potassium hypophosphite, lithium hypophosphite and the like are preferred from the viewpoints of an effect of accelerating the polymerization reaction of the polyamide (X) and an effect of preventing the coloring, and sodium hypophosphite is more preferred.

<Mole Concentrations of Phosphorus Atom, Alkali Metal Atom and Alkaline Earth Metal Atom>

A mole concentration P of a phosphorus atom contained per g of the polyamide resin composition of the present invention is 0.32 μmol/g or more and less than 6.46 μmol/g, preferably 0.50 to 6.00 μmol/g and more preferably 0.65 to 5.17 μmol/g from the viewpoints of enhancing the processing stability in the melt processing and preventing the polyamide (X) from being colored. If P is too low, the polyamide is colored during the polymerization or the molding in a certain case. Also, if P is 6.46 μmol/g or more, the polyamide is observed to be improved in coloring, but gelation reaction is accelerated in synthesis of the polyamide, and the back pressure is elevated in the mold processing in a certain case by clogging of a filter which is considered to be attributable to a thermally modified product of the phosphorus atom-containing compound (B).

A sum M of values obtained by multiplying a mole concentration of an alkali metal atom and a mole concentration of an alkaline earth metal atom each contained per g of the polyamide resin composition of the present invention by valencies thereof respectively (hereinafter referred to as "a total mole concentration of an alkali metal atom and an alkaline earth metal atom") is 0.50 μmol/g or more and less than 17.00 μmol/g, preferably 1.00 to 15.00 μmol/g and more preferably 2.00 to 12.00 μmol/g from the viewpoints of preventing gels and burnt deposits from being produced in the melt processing.

It is estimated that controlling M to 0.50 μmol/g or more makes it possible to retard an increase in a molecular weight of the polyamide which is brought about by heating when the polyamide is molten to inhibit gels and burnt deposits from being produced. On the other hand, if M is 17.00 μmol/g or more, inferior molding is caused in a certain case by a reduction in the viscosity. In addition thereto, coloring and whitening are brought about, and the alkali compound (A) is deposited in a certain case.

As described above, the alkali metal salt is used as the phosphorus atom-containing compound (B) in a certain case. Further, as described later, in the production of the polyamide resin composition of the present invention, the alkali metal compound (C) is added, if necessary, in the polycondensation of the polyamide, and the alkali compound (A) is added after the polycondensation of the polyamide. Accordingly, M is a sum (μmol/g) of values obtained by multiplying the mole concentrations of all of an alkali metal atom and an alkaline earth metal atom each contained per g of the polyamide resin composition by valencies thereof respectively.

In the present invention, a value (M/P) obtained by dividing a total mole concentration M of an alkali metal atom and an alkaline earth metal atom each contained per g of the polyamide resin composition of the present invention by a mole concentration P of a phosphorus atom contained per g of the polyamide resin composition of the present invention is 2 or more and 3 or less, preferably 2.1 to 2.9 and more preferably 2.2 to 2.8 from the viewpoints of preventing production of gels and burnt deposits which is brought about in the melt processing, enhancing the processing stability in the melt processing and preventing the polyamide (X) from being colored. If M/P is less than 2, an effect of inhibiting the amidation reaction by the alkali compound (A) is short in a certain case, and gels in the polyamide is increased in some cases. On the other hand, if M/P exceeds 3, inferior molding is caused in a certain case by a reduction in the viscosity. In addition thereto, coloring and whitening are brought about in some cases, and the alkali compound (A) is deposited in a certain case.

[Production Process of Polyamide Resin Composition]

The polyamide resin composition of the present invention can be produced by a process comprising the following steps (a) and (b):

Step (a): a step in which diamine containing 70 mol % or more of metaxylylenediamine and dicarboxylic acid are subjected to polycondensation under the presence of the phosphorus atom-containing compound (B) to obtain the polyamide (X); and Step (b): a step in which the alkali compound (A) is added to the polyamide (X) obtained in the step (a) described above.

<Step (a)>

The step (a) is a step in which diamine containing 70 mol % or more of metaxylylenediamine and dicarboxylic acid are subjected to polycondensation under the presence of the phosphorus atom-containing compound (B) to obtain the polyamide (X). Subjecting the polyamide (X) to polycondensation under the presence of the phosphorus atom-containing compound (B) makes it possible to enhance the processing stability in the melt processing and prevent the polyamide (X) from being colored.

A use amount of the phosphorus atom-containing compound (B) is an amount in which a mole concentration P of a phosphorus atom contained per g of the polyamide resin composition falls in the range described above.

The production process for the polyamide (X) shall not specifically be restricted as long as it is carried out under the presence of the phosphorus atom-containing compound (B), and it can be carried out by an optional method on optional polymerization conditions. The polyamide (X) can be produced, for example, by heating a nylon salt comprising a diamine component (for example, metaxylylenediamine) and a dicarboxylic acid component (for example, adipic acid) under the presence of water in a pressurizing state to polymerize them in a melting state while removing added water and condensation water.

Further, the polyamide (X) can be produced as well by a method in which the diamine component (for example, metaxylylenediamine) is added directly to the dicarboxylic acid component (for example, adipic acid) staying in a melting state to subject them to polycondensation under an atmospheric pressure. In the above case, the diamine component is continuously added to the dicarboxylic acid component in order to maintain the reaction system in an even liquid state, and during that time, the polycondensation is promoted while heating the reaction system so that the reaction temperature is not lower than the melting points of oligoamide and polyamide each produced.

A small amount of monoamine and monocarboxylic acid may be added as a molecular weight controlling agent in the polycondensation of the polyamide (X).

Further, the polyamide (X) may be subjected to polycondensation by subjecting to solid phase polymerization after produced by a melt polymerization method. The solid phase polymerization shall not specifically be restricted, and it can be carried out by an optional method on optional polymerization conditions.

The polycondensation of the polyamide (X) is carried out preferably under the presence of the phosphorus atom-containing compound (B) and the alkali metal compound (C). A sufficiently large amount of the phosphorus atom-containing compound (B) has to be added in order to prevent the polyamide (X) from being colored during the polycondensation, but if a use amount of the phosphorus atom-containing compound (B) is too large, not only the amidation reaction rate is accelerated too much to make it difficult to control the polymerization, but also production of gels and burnt deposits is likely to be brought about in the mold processing. Accordingly, the alkali metal compound (C) is preferably allowed to be coexistent from the viewpoint of controlling the amidation reaction rate.

The alkali metal compound (C) shall not specifically be restricted, and alkali metal hydroxides and alkali metal acetic acid salts can be listed as the preferred specific examples thereof. Lithium hydroxide, sodium hydroxide, potassium hydroxide, rubidium hydroxide and cesium hydroxide can be listed as the alkali metal hydroxides, and lithium acetate, sodium acetate, potassium acetate, rubidium acetate and cesium acetate can be listed as the alkali metal acetic acid salts.

When the alkali metal compound (C) is used in obtaining the polyamide (X) by polycondensation, a use amount of the alkali metal compound (C) falls in a range of preferably 0.5 to 1, more preferably 0.55 to 0.95 and further preferably 0.6 to 0.9 in terms of a value obtained by dividing a mole number of the alkali metal compound (C) by a mole number of the phosphorus atom-containing compound (B) from the viewpoint of inhibiting gels and burnt deposits from being produced.

<Step (b)>

The step (b) is a step in which the alkali compound (A) is added to the polyamide (X) obtained in the step (a) described above.

A molded article obtained by subjecting the polyamide (X) as it is to mold processing is excellent in properties and appearance immediately after starting molding, but generation of gels and burnt deposits is increased as the molding processing work continues for a long time, and the quality of the product becomes unstable in a certain case. Particularly in a case of the film, it is broken by the gels, and the apparatus can not help being stopped, so that the production efficiency is deteriorated. This is estimated to take place due to that the polyamide continues to stay locally in a melt-kneading part through a dice, whereby it is excessively heated and gelatinized and that the gels produced flow out. Further, in molding a bottle, the polyamide staying in an inside of a flow channel in a molding machine is deteriorated by excessively heating to result in generating burnt deposits, and they clog the flow channel and are mixed in the bottle of the product to deteriorate the quality of the bottle. In order to meet the above matters, the alkali compound (A) is added to the resulting polyamide (X) in the present invention in order to prevent gels and burnt deposits brought about in the mold processing from being produced.

The present inventors have found from measurement of the molecular weight by a gel permeation chromatography that continuous heating of the polyamide in a molten state promotes polarization of the polyamide into a low molecular weight and a high molecular weight and that the more the high molecular weight component is, the more the production amount of gels and burnt deposits is increased in the mold processing of the polyamide. A mechanism of generating burnt deposits is not apparent, and it is estimated that the polyamide stays and is excessively heated in an inside of the apparatus, that is, flow channel parts of the molten resin such as a screw, an inside of the extruding equipment, an inside of the die, a hot runner and the like, whereby a molecular weight thereof is elevated, so that the polyamide is deteriorated in flowing in the above parts; accordingly, the polyamide is liable to stay more and more in the above parts, and finally, the polyamide staying there is excessively heated to result in generating burnt deposits.

In contrast with this, the present inventors have found as well that the high molecular weight component is decreased by adding the alkali compound (A) to the polyamide. The reasons thereof have not yet been clarified and are estimated to be attributable to that particularly progress of amidation brought about during molding the polyamide resin composition is retarded by adding the alkali compound (A) to result in inhibiting an increase in the molecular weight; flow in an inside of the apparatus is maintained in a good state, and the polyamide can be prevented from being excessively heated; and as a result thereof, gels and burnt deposits are inhibited from being produced.

As described above, the same compounds as the examples of the alkali metal compound (C) which can be added in producing the polyamide (X) are shown as the examples of the alkali compound (A). However, if the alkali metal compound (C) is excessively added in the melt polymerization, an effect of accelerating the amidation reaction of the phosphorus atom-containing compound (B) is inhibited too much to retard progress of the polycondensation, and the thermal history in producing the polyamide grows large to increase gels and burnt deposits in the mold processing of the polyamide in a certain case. Accordingly, increasing an amount of the alkali metal compound (C) added in producing the polyamide (X) by melt-polymerizing the monomer can not play a role of preventing gels and burnt deposits from being produced in the mold processing. In contrast with this, gels and burnt deposits can effectively be prevented from being produced in the mold processing in the present invention by adding the alkali compound (A) to the polyamide (X) obtained.

A use amount of the Alkali compound (A) is an amount in which a total mole concentration M of an alkali metal atom and an alkaline earth metal atom each contained per g of the polyamide resin composition falls in the range described above, and it is an amount in which M/P falls in the range described above.

A method for adding the alkali compound (A) to the polyamide (X) shall not specifically be restricted, and it can be added by an optional method. A method in which the polyamide (X) and the alkali compound (A) are molten and kneaded by means of an extrusion equipment is preferred.

Optional extrusion equipments such as a batch system kneading equipment, a kneader, a cokneader, a planetary extrusion equipment, a single shaft or double shaft extrusion equipment and the like can be used as the extrusion equipment. Among them, the single shaft extrusion equipment and the double shaft extrusion equipment are preferably used from the viewpoints of a kneading ability and a productivity.

A means for supplying the polyamide (X) and the alkali compound (A) to the extrusion equipment shall not specifically be restricted, and a belt feeder, a screw feeder, a vibration feeder and the like can be used. The polyamide (X) and the alkali compound (A) may be supplied respectively by an independent feeder or may be dry-blended and then supplied.

A shape of the alkali compound (A) shall not specifically be restricted as long as it can evenly be dispersed in the resin composition, and it may be added as it is or may be added after molten by heating or may be added after dissolved in a solvent. When added as it is in the form of powder, a particle diameter thereof is preferably 0.01 to 5.0 mm, more preferably 0.02 to 3.0 mm. When the alkali compound (A) is dissolved in a solvent and then added, it can be added to the extrusion equipment by means of an equipment such as a feeder for adding a solution and the like or can be blended in advance by means of a tumbler. Water and optional organic solvents can be used as the solvent.

The polyamide (X) and the alkali compound (A) may be mixed directly in the mold processing. Further, the polyamide (X) may be molten and kneaded with the alkali compound (A) having a high concentration by means of an extrusion equipment to prepare pellets, and the above pellets may be blended with the polyamide (X) and subjected mold processing. Alternatively, the above pellets may be blended with the polyamide (X) and subjected to solid phase polymerization, and then it may be subjected to mold processing.

Further, in order to prevent separation of the polyamide (X) from the alkali compound (A) after dry-blended, a viscous liquid is adhered as a spreading agent to the polyamide (X), and then the alkali compound (A) may be added and mixed therewith. The spreading agent shall not specifically be restricted, and surfactants and the like can be used.

In the preferred production process for the polyamide resin composition of the present invention, the step (b) described above contains steps (b1) and (b2) shown below.

Step (b1): a step in which 90 to 99 parts by mass of the polyamide (X) and 10 to 1 part by mass of the alkali compound (A) are molten and kneaded by means of an extrusion equipment to obtain a polyamide master batch (Y).

Step (b2): a step in which 0.1 to 20 parts by mass of the polyamide master batch (Y) obtained in the step (b1) described above and 99.9 to 80 parts by mass of the polyamide (X) are molten and kneaded.

In the above process, the polyamide (X) and the alkali compound (A) are molten and kneaded by means of the extrusion equipment to obtain the polyamide master batch (Y) containing the alkali compound (A) having a high concentration, and then the polyamide master batch (Y) obtained and the polyamide (X) are blended and then molten and kneaded to obtain a polyamide resin composition. Production of gels can be inhibited in a mold processing in which adding directly the alkali compound (A) to the polyamide (X). Further, using the polyamide master batch (Y) obtained by melting and kneading the polyamide (X) and the alkali compound (A), the alkali compound (A) can be enough dispersed in molding products, thereby obtaining the molding products having a more stable moldability and a good appearance without whitening and irregularities.

In the present invention, examples of the alkali compound (A) include hydroxides, hydrides, alkoxides, carbonates, hydrogencarbonates and carboxylates of alkali metals and alkaline earth metals, and anhydrous salts and hydrate salts thereof can be used. Mass ratio between the polyamide (X) and the alkali compound (A) in the polyamide master batch (Y) is calculated by reducing mass of the alkali compound (A) to an anhydrous salt equivalent mass even if the alkali compound (A) is a hydrate salt.

In the step (b1), a blend ratio (the polyamide (X)/the alkali compound (A)) of the polyamide (X) and the alkali compound (A) is preferably 90 to 99 parts by mass/10 to 1 parts by mass, more preferably 92 to 99 parts by mass/8 to 1 parts by mass and further preferably 94 to 98 parts by mass/6 to 2 parts by mass from the viewpoints of inhibiting a reduction in the viscosity and inhibiting production of gels and burnt deposits and coloring.

In the step (b2), a blend ratio (the polyamide master batch (Y)/the polyamide (X)) of the polyamide master batch (Y) and the polyamide (X) is preferably 0.1 to 20 parts by mass/99.9 to 80 parts by mass, more preferably 0.5 to 20 parts by mass/99.5 to 80 parts by mass, further preferably 0.5 to 10 parts by mass/99.5 to 90 parts by mass and further preferably 1 to 5 parts by mass/99 to 95 parts by mass from the viewpoints of the moldability and inhibiting production of gels and burnt deposits.

In the polyamide resin composition of the present invention produced by the process described above, gels can be inhibited from being produced in melt polymerization of the polyamide, and gels and burnt deposits can be inhibited from being produced as well in mold processing of the resin composition obtained.

In the present invention, an effect of inhibiting gels of the polyamide resin composition from being produced is evaluated by comparing a gel fraction of the polyamide heated at a fixed temperature for a fixed time in a molten state at a high pressure under the estimation of a state to which the polyamide is exposed in molding. When the resin heated under pressure is dipped in hexafluoroisopropanol (HFIP) for 24 hours, the resin which is not gelatinized is completely dissolved therein, but the resin which is gelatinized remains in the form of an insoluble component of a swollen state. The gel fraction is calculated from the above insoluble component. The gel fraction referred to in the present invention means a value determined in terms of a percentage by dividing a mass of a residue obtained by filtrating the above insoluble component under vacuum by a membrane filter and then drying it by a denominator which is a mass of the resin weighed in advance before dipping in HFIP.

A gel fraction of the polyamide resin composition of the present invention is smaller than a gel fraction of a polyamide resin composition produced without adding the alkali compound (A) after polymerizing the polyamide. This shows that gels are inhibited from being produced in mold processing of the polyamide resin composition of the present invention. A gel fraction of the polyamide resin composition of the present invention observed when it is allowed to stay for a prescribed time at 270 to 290° C. which is a resin temperature of the polyamide resin in mold processing is preferably ½ or less, more preferably ⅓ or less and further preferably ⅕ or less of a gel fraction observed when the polyamide resin composition produced without adding the alkali compound (A) is allowed to stay on the same conditions. The staying time can be set to, for example, 24, 36 or 72 hours.

The index that the polyamide resin composition of the present invention has a good appearance and good physical properties can be evaluated by an average production amount of fish eyes counted by observing a film prepared from the polyamide resin composition under a fish eye inspection equipment. A cause of generating fish eyes in the polyamide resin composition is considered to be attributable to flowing of gels generated in the molding machine and insoluble matters precipitated from the polyamide resin composition. In the present invention, a count number of foreign matters having a circle-corresponding diameter of 20 µm or more is preferably 900 pieces or less, more preferably 700 pieces or less and further preferably 600 pieces or less per $m^2$ of the polyamide film having a thickness of 50 µm. If it exceeds 900 pieces, irregularities are visually confirmed to be present on a film surface, and the appearance is damaged. In addition thereto, breaking is likely to be brought about in molding, and therefore it is not preferred.

The polyamide resin composition of the present invention can be blended with one or a plurality of other resins such as nylon 6, nylon 66, nylon 66,6, polyesters, polyolefins, phenoxy resins and the like as long as the object is not damaged. Further, capable of being added are additives including inorganic fillers such as glass fibers, carbon fibers and the like; tabular inorganic fillers such as glass flakes, talc, kaolin, mica, montmorillonite, organic clays and the like; impact resistant modifying materials such as various elastomers and the like; crystal nucleus agents; lubricants such as fatty acid amide base lubricants, fatty acid amide base compounds and the like; antioxidants such as copper compounds, organic or inorganic halogen base compounds, hindered phenol base antioxidants, hindered amine base antioxidants, hydrazine base antioxidants, sulfur base compounds, phosphorus base compounds and the like; coloring inhibitors; UV absorbers such as benzotriazole base UV absorbers and the like; additives such as mold releasing agents, plasticizers, coloring agents and the like; compounds containing cobalt metal, benzoquinones, anthraquinones and naphthoquinones which are compounds providing an oxygen scavenging ability.

The polyamide resin composition of the present invention is excellent in a gas-barrier property and a transparency and has a stable melt characteristic. The polyamide resin composition of the present invention can be processed into various shapes such as sheets, films, injection-molded bottles, blow bottles, injection-molded cups and the like by making use of the above polyamide resin composition for at least a part thereof to prepare molded articles. It can be used preferably for packaging materials, packaging vessels and fiber materials.

A production method of the molded articles shall not specifically be restricted, and they can be produced by optional methods. They can be produced by, for example, extrusion molding and injection molding. Also, the molded articles obtained by extrusion molding and injection molding may be further subjected to mold processing by single shaft stretching, double shaft stretching, stretching blow and the like.

To be specific, they can be processed into films and sheets by an extrusion method in which a T die is equipped, an inflation film method and the like, and the raw material films obtained are further subjected to stretching processing, whereby stretched films and heat shrinkable films can be obtained. Further, injection-molded cups can be prepared by an injection molding method, and blow bottles can be prepared by a blow molding method. A preform is produced by injection molding, and then a bottle can be prepared from it by blow molding.

Also, they can be processed as well into films and sheets having a multilayer structure with other resins, for example, polyethylene, polypropylene, nylon 6 and PET, metal foils, papers and the like by methods such as extrusion laminate, coextrusion and the like. The processed films and sheets can be used for wraps, pouches of various shapes, cap materials for vessels, packaging vessels such as bottles, cups, trays, tubes and the like. Further, they can be processed as well into preforms and bottles having a multilayer structure with PET and the like by a multilayer injection molding method.

Packaging vessels obtained by making use of the polyamide resin composition of the present invention are excellent in a gas-barrier property and a transparency. The above packing vessels can be charged with various products including, for example, liquid beverages such as carbonated beverages, juices, water, milk, Japanese sake, whisky, distilled spirits, coffee, tea, jelly beverages, health beverages and the like, seasonings such as seasoning liquids, sauces, soy sauces, dressings, liquid stocks, mayonnaises, fermented soybean pastes, grated spices and the like, paste foods such as jams, creams, chocolate pastes and the like, liquid foods represented by liquid processed foods such as liquid soups, cooked foods, pickles, stews and the like, crude noodles and boiled noodles such as buckwheat noodles, noodles, Chinese noodles and the like, rice before cooking such as milled rice, humidity-conditioned rice, non-washing rice and the like, cooked rice, high moisture foods represented by processed rice products such as boiled rice mixed with fishes and vegetables, festive red rice, rice gruel and the like; low moisture foods represented by powder seasonings such as powder soup, instant bouillon and the like, dried vegetables, coffee beans, coffee powder, tea, cakes prepared from cereals as raw materials; solid and liquid chemicals such as agricultural chemicals, insecticides and the like, liquid and paste drugs and medicines, skin lotions, skin creams, skin emulsions, hair dressings, hair dyes, shampoos, soaps, detergents and the like.

The polyamide resin composition of the present invention can be used as materials for gasoline tanks and hoses of cars, bikes and the like as gasoline-barrier materials. The polyamide resin composition of the present invention can be used as a fiber material for monofilaments and the like.

[Multilayer Molded Articles]

The multilayer molded article of the present invention comprises an outermost layer, an innermost layer and at least one gas-barrier layer between the outermost layer and the innermost layer, and the polyamide resin composition of the present invention is used as the gas-barrier layer in order to prevent gels and burnt deposits from being produced in the mold processing. The multilayer molded article of the present invention is preferably a multilayer bottle obtained by blow-molding a multilayer preform by a hot parison method or a cold parison method.

(Polyester Resin)

The outermost layer and the innermost layer in the multilayer molded article of the present invention are constituted from a polyester resin comprising a dicarboxylic acid unit containing 80 mol % or more of a terephthalic acid unit and a diol unit containing 80 mol % or more of an ethylene glycol unit. Also, the multilayer molded article of the present invention may have an intermediate layer if necessary, and it is constituted preferably from the polyester resin described above. The polyester resin constituting the outermost layer, the innermost layer and the intermediate layer may be same of different.

The polyester resin constituting the outermost layer, the innermost layer and the intermediate layer in the multilayer molded article of the present invention is a polyester resin comprising a dicarboxylic acid unit containing 80 mol % or more, preferably 90 mol % or more of a terephthalic acid unit and a diol unit containing 80 mol % or more, preferably 90 mol % or more of an ethylene glycol unit. The above polyester resin is obtained by subjecting a dicarboxylic acid component containing 80 mol % or more, preferably 90 mol % or more of terephthalic acid and a diol component containing 80 mol % or more, preferably 90 mol % or more of ethylene glycol to polycondensation reaction.

Polyethylene terephthalate is suitably used as the polyester resin. Excellent characteristics can be exerted in all of a transparency, a mechanical strength, an injection moldability and a stretching blow moldability with which polyethylene terephthalate is provided.

Isophthalic acid, diphenyl ether-4,4-dicarboxylic acid, naphthalene-1,4- or -2,6-dicarboxylic acid, adipic acid, sebacic acid, decane-1,10-carboxylic acid and hexahydroterephthalic acid can be as the dicarboxylic acid component other than terephthalic acid. Also, propylene glycol, 1,4-butanediol, neopentyl glycol, diethylene glycol, cyclohexanedimethanol, 2,2-bis(4-hydroxyphenyl)propane, 2,2-bis(4-hydroxyethoxyphenyl)propane and the like can be as the diol component other than ethylene glycol. Further, oxyacids such as p-oxybenzoic acid and the like can also be used as a raw material monomer for the polyester resin.

An intrinsic viscosity of the polyester resin is preferably 0.55 to 1.30, more preferably 0.65 to 1.20. If the intrinsic viscosity is 0.55 or more, a multilayer preform can be obtained in a transparent amorphous state, and the multilayer bottle obtained has a satisfactory mechanical strength. Further, if the intrinsic viscosity is 1.30 or less, a bottle is readily molded without damaging a fluidity in molding.

The outermost layer and the innermost layer in the multilayer molded article of the present invention may contain other thermoplastic resins and various additives as long as the characteristics of the polyester resin are not damaged, but the polyester resin accounts preferably for 90% by mass or more.

Thermoplastic polyester resins such as polyethylene 2,6-naphthalenedicaboxylate and the like, polyolefin base resins, polycarbonate, polyacrylonitrile, polyvinyl chloride, polystyrene and the like can be shown as the examples of the thermoplastic resins described above.

Further, UV absorbers, oxygen absorbers, coloring agents, IR absorbers (reheat additive) for accelerating heating of a preform to shorten recycling time in molding and the like can be shown as the examples of the additives described above.

(Production Method of Multilayer Molded Article)

The multilayer molded article of the present invention, particularly the multilayer bottle is obtained by injecting a polyester resin from an injection cylinder at a skin side and a polyamide resin from an injection cylinder at a core side into a metal die cavity through a metal die hot runner by means of an injection molding machine equipped with two injection cylinders to obtain a multilayer preform and subjecting the preform obtained above to double shaft stretching blow molding by a publicly known method. Alternatively, it is obtained by extruding a polyester resin from an extruding equipment at a skin side and a polyamide resin from an extruding equipment at a core side in a cylindrical form by means of a blow molding machine equipped with two extruding equipments and subjecting the extruded matter intermittently to blow molding. Also, an adhesive layer may be provided, if necessary, between the layers.

In general, publicly known methods such as a so-called cold parison method, a so-called hot parison method and the like are available as a method for blow-molding a multilayer preform which is a precursor. It includes, for example, a method in which the multilayer preform is heated on a surface at 80 to 120° C. and then stretched in an axial direction by a mechanical means such as pushing by a core rod insert and in which it is then stretched in a lateral direction and blow-molded by blowing high pressure air of usually 2 to 4 MPa and a method in which the multilayer preform is crystallized in a mouth part and heated on a surface at 80 to 120° C. and in which it is then blow-molded in a metal die of 90 to 150° C.

In the present invention, a heating temperature of the preform is preferably 90 to 110° C., more preferably 95 to 108° C. If a heating temperature of the preform is lower than 90° C., heating is insufficient, and the gas-barrier layer or the PET layer is cold-stretched and whitened in a certain case. If it is higher than 110° C., the gas-barrier layer is crystallized and whitened in a certain case. Further, the interlayer peeling resistant performance is reduced in a certain case.

In the present invention, the gas-barrier property and the moldability are excellent, and therefore the multilayer bottle has preferably a three layer structure of a polyester resin layer/a gas-barrier layer/a polyester resin layer or a five layer structure of a polyester resin layer/a gas-barrier layer/a polyester resin layer/a gas-barrier layer/a polyester resin layer.

The multilayer bottle of a three layer structure or a five layer structure is obtained by subjecting a multilayer preform of a three layer structure or a five layer structure to double shaft stretching blow molding by a publicly known method. A production method for the multilayer preform of a three layer structure or a five layer structure shall not specifically be restricted, and publicly known methods can be used. For example, in a step in which the polyester resin constituting the innermost layer and the outermost layer is injected from a skin side injection cylinder and in which the resin constituting the gas-barrier layer is injected from a core side injection cylinder, the polyester resin is first injected, and then the resin constituting the gas-barrier layer and the polyester resin are injected at the same time; next, a required amount of the polyester resin is injected to fulfill a metal die cavity, whereby the multilayer preform of a three layer structure (a polyester resin layer/a gas-barrier layer/a polyester resin layer) can be produced.

Further, in a step in which the polyester resin constituting the innermost layer and the outermost layer is injected from a skin side injection cylinder and in which the resin constituting the gas-barrier layer is injected from a core side injection cylinder, the polyester resin is first injected, and then the resin constituting the gas-barrier layer is injected separately; finally, the polyester resin is injected to fulfill a metal die cavity, whereby the multilayer preform of a five layer structure (a polyester resin layer/a gas-barrier layer/a polyester resin layer/a gas-barrier layer/a polyester resin layer) can be produced.

The method for producing the multilayer preform shall not be restricted to the methods described above.

A thickness of the polyester resin layer in the multilayer preform is preferably 0.01 to 1.0 mm, and a thickness of the gas-barrier layer is preferably 0.005 to 0.2 mm (5 to 200 μm). A thickness of the multilayer bottle does not have to be fixed over a whole part of the bottle and falls usually in a range of 0.2 to 1.0 mm.

In the multilayer bottle obtained by subjecting the multilayer preform to double shaft stretching blow molding, the gas-barrier performance can be exerted as long as the gas-barrier layer is present at least on a barrel part of the multilayer bottle, and if the gas-barrier layer is extended up to a tip vicinity of a stopper part in the multilayer bottle, the gas-barrier performance is further better.

In the multilayer molded article of the present invention, a mass of the gas-barrier layer accounts for preferably 1 to 20% by mass, more preferably 2 to 15% by mass and particularly preferably 3 to 10% by mass based on a total mass of the multilayer bottle. Controlling a mass of the gas-barrier layer to the ranges described above provides a multilayer bottle having a good gas-barrier property and makes it easy to mold the multilayer preform which is a precursor into the multilayer bottle.

The multilayer molded article of the present invention provides less burnt deposit mixed in the products. The multilayer molded article of the present invention is suitable for receiving and storing various products including, for example, liquid beverages such as carbonated beverages, juices, water, milk, Japanese sake, whisky, distilled spirits, coffee, tea, jelly beverages, health beverages and the like, seasonings such as seasoning liquids, sauces, soy sauces, dressings, liquid stocks and the like, liquid foods such as liquid soups and the like, liquid drugs and medicines, skin lotions, skin emulsions, hair dressings, hair dyes, shampoos and the like. The multilayer molded article of the present invention generates less burnt deposit in production and prevents the burnt deposits from clogging flow channels in an inside of a molding machine, and it can cut a labor hour for maintenance of the apparatus and contribute to stable production of the multilayer bottle and the like.

EXAMPLES

The present invention shall be explained below in further details with reference to examples, but the present invention shall not be restricted to them.

[Measurement of Physical Properties of Polyamide and Polyamide Resin Composition]

A terminal amino group concentration and a terminal carboxyl group concentration in the polyamide and a total mole concentration M of an alkali metal atom and an alkaline earth metal atom and a mole concentration P of a phosphorus atom in the polyamide resin composition were measured by the following methods.

(1) Terminal Amino Group Concentration:

Polyamide 0.3 to 0.5 g was precisely weighed and dissolved in 30 ml of a phenol/ethanol solution (4/1 volume ratio) at 20 to 30° C. by stirring. After completely dissolved, the solution was neutralized and titrated by an N/100 hydrochloric acid aqueous solution while stirring to determine the terminal amino group concentration.

(2) Terminal Carboxyl Group Concentration:

Polyamide 0.3 to 0.5 g was precisely weighed and dissolved in 30 ml of benzyl alcohol at 160 to 180° C. by stirring under nitrogen flow. After completely dissolved, the solution was cooled down to 80° C. or lower under nitrogen flow, and 10 ml of methanol was added thereto while stirring. The solution was neutralized and titrated by an N/100 sodium hydroxide aqueous solution to determine the terminal carboxyl group concentration.

(3) Total Mole Concentration M of an Alkali Metal Atom Concentration and an Alkaline Earth Metal Atom Concentration and a Mole Concentration P of a Phosphorus Atom:

A total mole concentration M of an alkali metal atom and an alkaline earth metal atom and a mole concentration P of a phosphorus atom each contained per g of the polyamide resin composition were quantitatively determined by means of an atomic absorption spectrometer (trade name: AA-6650, manufactured by Shimadzu Corporation) and an ICP emission spectrometer (trade name: ICPE-9000, manufactured by Shimadzu Corporation) after the polyamide resin composition was subjected to decomposition treatment in nitric acid by a microwave. The measured values were obtained in terms of a mass ratio (ppm), and therefore M and P were calculated by using the atomic masses and the valencies.

[Evaluation of Film]

The films obtained in the example and the comparative example were evaluated by the following methods.

(1) Fish Eye Number:

The films obtained in the example and the comparative example were allowed to pass between a camera of a fish eye inspection equipment and a light source and reeled on a reeling equipment, and a fish eye number (circle-corresponding diameter: 20 μm or more) of the film having a width of 10 cm, a length of 50 m and a thickness of 50 μm was counted when one hour passed since starting extrusion to calculate the fish eye number per m². The smaller the fish eye number is, the more preferable.

(2) Resin Pressure of Extrusion Equipment Head:

After finishing counting of the fish eye number, the reeling velocity was adjusted to prepare a film having a width of 15 cm and a thickness of 250 μm. Then, the extrusion was continued to measure the resin pressures of the extrusion equipment head respectively immediately after starting the extrusion, after 3 hours passed and after 6 hours passed, and the presence of a change thereof was measured. A smaller change amount of the resin pressures of the extrusion equipment head is preferred.

(3) Appearance of the Film:

The appearance of the films obtained was visually observed. It is preferred that coloring and foreign matters such as gels and the like are not observed in the films.

(4) Gel Fraction:

(Preparation of Staying Sample)

The film having a thickness of 250 μm described above was cut in a form of a circle having a diameter of 30 mm, and four sheets thereof were prepared. The above circular films were concentrically superposed and inserted into a hole part of a 100×100 mm polytetrafluoroethylene sheet of 1 mm thickness having a hole bored in a diameter of 30 mm, and further, the above sheet was interposed between two 100×100 mm polytetrafluoroethylene sheets of 1 mm thickness.

Next, the foregoing polytetrafluoroethylene sheets which interposed the film described above therebetween were disposed in a center of the groove in a 150×150 mm metal plate of 15 mm thickness having a 120×120 mm groove of 3 mm depth in a central part, and further, it was covered thereon with a 150×150 mm metal plate of 15 mm thickness. Then, the metal plates were fixed by a bolt.

Subsequently, the metal plates were heated on the respective conditions of 72 hours at 270° C., 24 hours at 290° C. or 36 hours at 290° C. in a state in which the above metal plates were interposed at 50 kg/cm² or more by a hot press equipment heated in advance. After each time passed, the above metal plates were taken out and quenched, and after they were sufficiently cooled down to room temperature, the staying sample was taken out.

(Calculation of Gel Fraction)

Next, the staying sample described above was dried at 60° C. for 30 minutes in a constant temperature dryer, and then 100 mg of the dried sample was immediately weighed. The weighed staying sample was dipped in 10 ml of hexafluoroisopropanol (HFIP) having a purity of 99% for 24 hours, and then it was filtrated under vacuum through a membrane filter having a pore diameter of 300 μm which was weighed in advance. A residue remaining on the membrane filter was washed three times by 2 ml of HFIP, and then the filter having thereon the residue was dried at 60° C. for 30 minutes in a constant temperature dryer.

A total mass of the residue and the filter which were dried was weighed, and an amount (gel amount) of an HFIP-insoluble component in the staying sample was calculated from a difference thereof from a mass of the membrane filter which was weighed in advance. The gel fraction was determined in terms of % by mass of the HFIP-insoluble component in the staying sample based on the staying sample before dipped in HFIP.

The same operation was carried out three times on the same conditions from preparation of the staying sample, and an average value of the gel fraction in the respective conditions was determined.

[Evaluation of Multilayer Molded Article (Preform)]

The preforms obtained in the example and the comparative example were evaluated by the following methods.

(1) Number of Burnt Deposits Generated:

The three layer preform (27 g) comprising a polyester resin layer/a gas-barrier layer/a polyester resin layer was injection-molded in 2,500 shots to obtain 10,000 sheets of the preforms. Among the preforms obtained, the number of the preforms having burnt deposits was counted.

(2) Stability of Preforms (PFM):

It was visually judged whether or not a barrier layer was stably present in the preform. Four sheets of the preforms obtained by injection in one cycle were cut in a vertical direction, and an iodine tincture was applied on a cross section thereof to dye only a polyamide resin composition layer (barrier layer), whereby it was confirmed whether or not the present positions of the barrier layers in the four preforms were aligned. If the barrier layers are not stably present, the present positions of the barrier layers in a neck part of the preforms are scattered, and the quality of the resulting products is deteriorated.

(3) Weighing Time:

Measured was time required for weighing a prescribed amount of the resin composition in a cylinder for melting and injection-molding the polyamide resin composition in molding the preform. The too long weighing time means that the moldability is inferior.

Example 101

Melt Polymerization of Polyamide

A reaction vessel having a content volume of 50 liter equipped with a stirrer, a partial condenser, a full condenser, a thermometer, a dropping funnel, a nitrogen introducing tube and a strand die was charged with 15,000 g (102.6 mole) of adipic acid precisely weighed, 2,496 mg (24.49 mmol, 30 ppm in terms of a phosphorus atom concentration in the polyamide) of sodium hypophosphite monohydrate ($NaH_2PO_2 \cdot H_2O$) and 1,239 mg (15.10 mmol, 0.62 in terms of a mole number ratio based on sodium hypophosphite monohydrate) of sodium acetate and sufficiently substituted with nitrogen, and then the vessel was heated up to 170° C. while stirring an inside of the system under a small amount of nitrogen flow. Metaxylylenediamine 13,895 g (102.0 mol) was dropwise added thereto while stirring, and an inside of the system was continuously heated while removing condensation water produced to an outside of the system. After finishing dropwise adding metaxylylenediamine, the internal temperature was controlled to 260° C. to continue the reaction for 40 minutes. Then, an inside of the system was pressurized by nitrogen to take out the polymer from the strand die, and this was pelletized to obtain about 24 kg of polyamide.

(Solid Phase Polymerization of Polyamide)

Next, a jacket-equipped tumble dryer in which a nitrogen gas introducing tube, a vacuum line, a vacuum pump and a thermocouple for measuring an inner temperature were provided was charged with the polyamide described above, and an inside of the tumble dryer was sufficiently substituted with nitrogen having a purity of 99% by volume or more while rotating it at a fixed speed. Then, the tumble dryer was heated under nitrogen gas flow, and the pellet temperature was elevated up to 150° C. in about 150 minutes. When the pellet temperature reached 150° C., a pressure in the system was reduced to 1 Torr or less. The temperature was further continued to be elevated, and after the pellet temperature was elevated up to 200° C. in about 70 minutes, the system was maintained at 200° C. for 30 to 45 minutes. Then, a nitrogen gas having a purity of 99% by volume or more was introduced into the system, and the tumble dryer was cooled while rotating to obtain polyamide (X101).

(Preparation of Polyamide Resin Composition (101))

Sodium acetate trihydrate 150 mg (75 ppm to the polyamide) was added to 2 kg of the polyamide (X101) obtained and stirred and mixed to thereby prepare a polyamide resin composition (101).

(Production of Film)

Next, a film was produced by means of a 25 mmφ single shaft extrusion equipment, a film extrusion equipment comprising a head provided with a filter of 600 mesh and a T die and a receiving equipment equipped with a cooling roll, a fish eye inspection equipment (model: GX70W, manufactured by Mamiya-OP Co., Ltd.) and a reeling device. The polyamide resin composition (101) was extruded in a film form from the extrusion equipment while maintaining a discharge rate of 3 kg/hour, and the receiving velocity was adjusted to prepare a film having a width of 15 cm and a thickness of 50 μm.

Example 102

Melt polymerization and pelletization were carried out in the same manners as in Example 101 to obtain about 24 kg of polyamide, except that an addition amount of metaxylylenediamine was changed to 13,916 g (102.2 mol) in preparation of the polyamide in Example 101. Then, solid phase polymerization was carried out in the same manner as in Example 101 to obtain polyamide (X102).

Sodium acetate trihydrate 150 mg (75 ppm to the polyamide) was added to 2 kg of the polyamide (X102) obtained above and mixed by stirring to thereby prepare a polyamide resin composition (102), and the physical properties thereof were measured in the same manners as in Example 101. Further, a film was produced in the same manner as in Example 101, except that the polyamide resin composition (102) was used, and it was evaluated. The results thereof are shown in Tables 1 and 2.

Example 103

A polyamide resin composition (103) was prepared in the same manner as in Example 102, except that an addition amount of sodium acetate trihydrate to the polyamide (X102) in Example 102 was changed to 200 mg (100 ppm to the polyamide), and the physical properties thereof were measured. Further, a film was produced in the same manner as in Example 101, except that the polyamide resin composition (103) was used, and it was evaluated. The results thereof are shown in Tables 1 and 2.

Example 104

A polyamide resin composition (104) was prepared in the same manner as in Example 101, except that an addition amount of sodium acetate trihydrate to the polyamide (X101) in Example 101 was changed to 300 mg (150 ppm to the polyamide), and the physical properties thereof were measured. Further, a film was produced in the same manner as in Example 101, except that the polyamide resin composition (104) was used, and it was evaluated. The results thereof are shown in Tables 1 and 2.

Example 105

A polyamide resin composition (105) was prepared in the same manner as in Example 102, except that an addition amount of sodium acetate trihydrate to the polyamide (X102) in Example 102 was changed to 300 mg (150 ppm to the polyamide), and the physical properties thereof were measured. Further, a film was produced in the same manner as in Example 101, except that the polyamide resin composition (105) was used, and it was evaluated. The results thereof are shown in Tables 1 and 2.

Example 106

Melt polymerization and pelletization were carried out in the same manners as in Example 101 to obtain about 24 kg of polyamide, except that in preparation of the polyamide in Example 101, an addition amount of sodium hypophosphite monohydrate was changed to 12,980 mg (122.4 mmol, 150 ppm in terms of a phosphorus atom concentration in the polyamide); an addition amount of sodium acetate was changed to 6,193 mg (75.49 mmol, 0.62 in terms of a mole number ratio based on sodium hypophosphite monohydrate); and an addition amount of metaxylylenediamine was changed to 13,916 g (102.2 mol). Then, solid phase polymerization was carried out in the same manner as in Example 101 to obtain polyamide (X103).

Sodium acetate trihydrate 600 mg (300 ppm to the polyamide) was added to 2 kg of the polyamide (X103) obtained above and mixed by stirring to thereby prepare a polyamide resin composition (106), and the physical properties thereof were measured in the same manners as in Example 101. Further, a film was produced in the same manner as in Example 101, except that the polyamide resin composition (106) was used, and it was evaluated. The results thereof are shown in Tables 1 and 2.

Example 107

A polyamide resin composition (107) was prepared in the same manner as in Example 106, except that an addition amount of sodium acetate trihydrate to the polyamide (X103) in Example 106 was changed to 700 mg (350 ppm to the polyamide), and the physical properties thereof were measured. Further, a film was produced in the same manner as in Example 101, except that the polyamide resin composition (107) was used, and it was evaluated. The results thereof are shown in Tables 1 and 2.

Example 108

A polyamide resin composition (108) was prepared in the same manner as in Example 106, except that an addition amount of sodium acetate trihydrate to the polyamide (X103) in Example 106 was changed to 1,000 mg (500 ppm to the polyamide), and the physical properties thereof were measured. Further, a film was produced in the same manner as in Example 101, except that the polyamide resin composition (108) was used, and it was evaluated. The results thereof are shown in Tables 1 and 2.

Example 109

A polyamide resin composition (109) was prepared in the same manner as in Example 106, except that an addition amount of sodium acetate trihydrate to the polyamide (X103) in Example 106 was changed to 1,600 mg (800 ppm to the polyamide), and the physical properties thereof were measured. Further, a film was produced in the same manner as in Example 101, except that the polyamide resin composition (109) was used, and it was evaluated. The results thereof are shown in Tables 1 and 2.

Example 110

Melt polymerization and pelletization were carried out in the same manners as in Example 101 to obtain about 24 kg of polyamide, except that in preparation of the polyamide in Example 101, an addition amount of sodium hypophosphite monohydrate was changed to 12,980 mg (122.4 mmol, 150 ppm in terms of a phosphorus atom concentration in the polyamide); an addition amount of sodium acetate was changed to 6,193 mg (75.49 mmol, 0.62 in terms of a mole number ratio based on sodium hypophosphite monohydrate); and an addition amount of metaxylylenediamine was changed to 13,874 g (101.9 mol). Then, solid phase polymerization was carried out in the same manner as in Example 101 to obtain polyamide (X104).

Sodium acetate trihydrate 1,600 mg (800 ppm to the polyamide) was added to 2 kg of the polyamide (X104) obtained above and mixed by stirring to thereby prepare a polyamide resin composition (110), and the physical properties thereof were measured in the same manners as in Example 101. Further, a film was produced in the same manner as in Example 101, except that the polyamide resin composition (110) was used, and it was evaluated. The results thereof are shown in Tables 1 and 2.

Example 111

Melt polymerization and pelletization were carried out in the same manners as in Example 101 to obtain about 24 kg of polyamide, except that in preparation of the polyamide in Example 101, an addition amount of sodium hypophosphite monohydrate was changed to 12,980 mg (122.4 mmol, 150 ppm in terms of a phosphorus atom concentration in the polyamide); an addition amount of sodium acetate was changed to 6,193 mg (75.49 mmol, 0.62 in terms of a mole number ratio based on sodium hypophosphite monohydrate); and an addition amount of metaxylylenediamine was changed to 13,853 g (101.7 mol). Then, solid phase polymerization was carried out in the same manner as in Example 101 to obtain polyamide (X105).

Sodium acetate trihydrate 1,600 mg (800 ppm to the polyamide) was added to 2 kg of the polyamide (X105) obtained above and mixed by stirring to thereby prepare a polyamide resin composition (111), and the physical properties thereof were measured in the same manners as in Example 101. Further, a film was produced in the same manner as in Example 101, except that the polyamide resin composition (111) was used, and it was evaluated. The results thereof are shown in Tables 1 and 2.

Example 112

Melt polymerization and pelletization were carried out in the same manners as in Example 101 to obtain about 24 kg of polyamide, except that in preparation of the polyamide in Example 101, an addition amount of sodium hypophosphite monohydrate was changed to 12,980 mg (122.4 mmol, 150 ppm in terms of a phosphorus atom concentration in the polyamide); an addition amount of sodium acetate was changed to 6,193 mg (75.49 mmol, 0.62 in terms of a mole number ratio based on sodium hypophosphite monohydrate); and an addition amount of metaxylylenediamine was changed to 13,958 g (102.5 mol). Then, solid phase polymerization was carried out in the same manner as in Example 101 to obtain polyamide (X106).

Sodium acetate trihydrate 1,600 mg (800 ppm to the polyamide) was added to 2 kg of the polyamide (X106) obtained above and mixed by stirring to thereby prepare a polyamide resin composition (112), and the physical properties thereof were measured in the same manners as in Example 101. Further, a film was produced in the same manner as in Example 101, except that the polyamide resin composition (112) was used, and it was evaluated. The results thereof are shown in Tables 1 and 2.

Example 113

Melt polymerization and pelletization were carried out in the same manners as in Example 101 to obtain about 24 kg of polyamide, except that in preparation of the polyamide in Example 101, an addition amount of sodium hypophosphite monohydrate was changed to 12,980 mg (122.4 mmol, 150 ppm in terms of a phosphorus atom concentration in the polyamide); an addition amount of sodium acetate was changed to 6,193 mg (75.49 mmol, 0.62 in terms of a mole number ratio based on sodium hypophosphite monohydrate); and an addition amount of metaxylylenediamine was changed to 13,937 g (102.3 mol). Then, solid phase polymerization was carried out in the same manner as in Example 101 to obtain polyamide (X107).

Sodium acetate trihydrate 1,600 mg (800 ppm to the polyamide) was added to 2 kg of the polyamide (X107) obtained above and mixed by stirring to thereby prepare a polyamide resin composition (113), and the physical properties thereof were measured in the same manners as in Example 101. Further, a film was produced in the same manners as in Example 101, except that the polyamide resin composition (113) was used, and it was evaluated. The results thereof are shown in Tables 1 and 2.

Example 114

A polyamide resin composition (114) was prepared in the same manner as in Example 106, except that an addition amount of sodium acetate trihydrate to the polyamide (X103) in Example 106 was changed to 1,800 mg (900 ppm to the polyamide), and the physical properties thereof were measured. Further, a film was produced in the same manner as in Example 101, except that the polyamide resin composition (114) was used, and it was evaluated. The results thereof are shown in Tables 1 and 2.

Example 115

Melt polymerization and pelletization were carried out in the same manners as in Example 101 to obtain about 24 kg of polyamide, except that in preparation of the polyamide in Example 101, an addition amount of sodium hypophosphite monohydrate was changed to 15,570 mg (146.9 mmol, 180 ppm in terms of a phosphorus atom concentration in the polyamide) and that an addition amount of sodium acetate was changed to 7,431 mg (90.59 mmol, 0.62 in terms of a mole number ratio based on sodium hypophosphite monohydrate). Then, solid phase polymerization was carried out in the same manner as in Example 101 to obtain polyamide (X108).

Sodium acetate trihydrate 800 mg (400 ppm to the polyamide) was added to 2 kg of the polyamide (X108) obtained above and mixed by stirring to thereby prepare a polyamide resin composition (115), and the physical properties thereof were measured in the same manners as in Example 101. Further, a film was produced in the same manner as in Example 101, except that the polyamide resin composition (115) was used, and it was evaluated. The results thereof are shown in Tables 1 and 2.

Example 116

A polyamide resin composition (116) was prepared in the same manner as in Example 115, except that an addition amount of sodium acetate trihydrate to the polyamide (X108) in Example 115 was changed to 2,000 mg (1,000 ppm to the polyamide), and the physical properties thereof were measured. Further, a film was produced in the same manner as in Example 101, except that the polyamide resin composition (116) was used, and it was evaluated. The results thereof are shown in Tables 1 and 2.

Example 117

Sodium acetate 400 mg (200 ppm to the polyamide) dissolved in 5 ml of distilled warm water was added to 2 kg of the polyamide (X103) obtained in Example 106 and mixed by stirring to thereby prepare a polyamide resin composition (117), and the physical properties thereof were measured in the same manners as in Example 101. Further, a film was produced in the same manner as in Example 101, except that the polyamide resin composition (117) was used, and it was evaluated. The results thereof are shown in Tables 1 and 2.

Example 118

A polyamide resin composition (118) was prepared in the same manner as in Example 117, except that an addition amount of sodium acetate to the polyamide (X103) in Example 117 was changed to 1,000 mg (500 ppm to the polyamide), and the physical properties thereof were measured. Further, a film was produced in the same manner as in Example 101, except that the polyamide resin composition (118) was used, and it was evaluated. The results thereof are shown in Tables 1 and 2.

Example 119

Sodium carbonate decahydrate 700 mg (350 ppm to the polyamide) was added to 2 kg of the polyamide (X103) obtained in Example 106 to thereby prepare a polyamide resin composition (119), and the physical properties thereof were measured in the same manners as in Example 101. Further, a film was produced in the same manner as in Example 101, except that the polyamide resin composition (119) was used, and it was evaluated. The results thereof are shown in Tables 1 and 2.

Example 120

A polyamide resin composition (120) was prepared in the same manners as in Example 119, except that an addition amount of sodium carbonate decahydrate to the polyamide (X103) in Example 119 was changed to 1,600 mg (800 ppm to the polyamide), and the physical properties thereof were measured. Further, a film was produced in the same manner as in Example 101, except that the polyamide resin composition (120) was used, and it was evaluated. The results thereof are shown in Tables 1 and 2.

Example 121

Lithium acetate dihydrate 2,000 mg (1,000 ppm to the polyamide) was added to 2 kg of the polyamide (X103) obtained in Example 106 and mixed by stirring to thereby prepare a polyamide resin composition (121), and the physical properties thereof were measured in the same manner as in Example 101. Further, a film was produced in the same manner as in Example 101, except that the polyamide resin composition (121) was used, and it was evaluated. The results thereof are shown in Tables 1 and 2.

Example 122

Potassium acetate 600 mg (300 ppm to the polyamide) was added to 2 kg of the polyamide (X103) obtained in Example 106 and mixed by stirring to thereby prepare a polyamide resin composition (122), and the physical properties thereof were measured in the same manners as in Example 101. Further, a film was produced in the same manner as in Example 101, except that the polyamide resin composition (122) was used, and it was evaluated. The results thereof are shown in Tables 1 and 2.

Comparative Example 101

The physical properties of the polyamide (X102) obtained in Example 102 were measured in the same manners as in Example 101. Further, a film was produced in the same manner as in Example 101, except that the polyamide (X102) was used and that sodium acetate trihydrate was not added, and it was evaluated. The results thereof are shown in Tables 1 and 2.

Comparative Example 102

The physical properties of the polyamide (X103) obtained in Example 106 were measured in the same manners as in Example 101. Further, a film was produced in the same manner as in Example 101, except that the polyamide (X103) was used and that sodium acetate trihydrate was not added, and it was evaluated. The results thereof are shown in Tables 1 and 2.

Comparative Example 103

A polyamide resin composition (123) was prepared in the same manners as in Example 102, except that an addition amount of sodium acetate trihydrate to the polyamide (X102) in Example 102 was changed to 50 mg (25 ppm to the polyamide), and the physical properties thereof were measured. Further, a film was produced in the same manners as in Example 101, except that the polyamide resin composition (123) was used, and it was evaluated. The results thereof are shown in Tables 1 and 2.

Comparative Example 104

A polyamide resin composition (124) was prepared in the same manner as in Example 106, except that an addition amount of sodium acetate trihydrate to the polyamide (X103) in Example 106 was changed to 300 mg (150 ppm to the polyamide), and the physical properties thereof were measured. Further, a film was produced in the same manner as in Example 101, except that the polyamide resin composition (124) was used, and it was evaluated. The results thereof are shown in Tables 1 and 2.

Comparative Example 105

Melt polymerization and pelletization were carried out in the same manners as in Example 101 to obtain about 24 kg of polyamide, except that in preparation of the polyamide in Example 101, an addition amount of metaxylylenediamine was changed to 13,972 g (102.6 mol). Then, solid phase polymerization was carried out in the same manner as in Example 101 to obtain polyamide (X109).

Sodium acetate trihydrate 300 mg (150 ppm to the polyamide) was added to 2 kg of the polyamide (X109) obtained above and mixed by stirring to thereby prepare a polyamide resin composition (125), and the physical properties thereof were measured in the same manners as in Example 101. Further, a film was produced in the same manner as in Example 101, except that the polyamide resin composition (125) was used, and it was evaluated. The results thereof are shown in Tables 1 and 2.

Comparative Example 106

Melt polymerization and pelletization were carried out in the same manners as in Example 11 to obtain about 24 kg of polyamide, except that in preparation of the polyamide in Example 101, an addition amount of metaxylylenediamine was changed to 13,839 g (101.6 mol). Then, solid phase polymerization was carried out in the same manner as in Example 101 to obtain polyamide (X110).

Sodium acetate trihydrate 300 mg (150 ppm to the polyamide) was added to 2 kg of the polyamide (X110) obtained above and mixed by stirring to thereby prepare a polyamide resin composition (126), and the physical properties thereof were measured in the same manners as in Example 101. Further, a film was produced in the same manners as in Example 101, except that the polyamide resin composition (126) was used, and it was evaluated. The results thereof are shown in Tables 1 and 2.

Comparative Example 107

A polyamide resin composition (127) was prepared in the same manners as in Example 102, except that an addition amount of sodium acetate trihydrate to the polyamide (X102) in Example 102 was changed to 700 mg (350 ppm to the polyamide), and the physical properties thereof were measured. Further, a film was produced in the same manner as in Example 101, except that the polyamide resin composition (127) was used, and it was evaluated. The results thereof are shown in Tables 1 and 2.

Comparative Example 108

Melt polymerization and pelletization were carried out in the same manners as in Example 101 to obtain about 24 kg of polyamide, except that in preparation of the polyamide in Example 101, an addition amount of sodium hypophosphite monohydrate was changed to 12,980 mg (122.4 mmol, 150 ppm in terms of a phosphorus atom concentration in the polyamide); an addition amount of sodium acetate was changed to 6,193 mg (75.49 mmol, 0.62 in terms of a mole number ratio based on sodium hypophosphite monohydrate); and an addition amount of metaxylylenediamine was changed to 13,972 g (102.6 mol). Then, solid phase polymerization was carried out in the same manner as in Example 1 to obtain polyamide (X111).

Sodium acetate trihydrate 1,600 mg (800 ppm to the polyamide) was added to 2 kg of the polyamide (X111) obtained above and mixed by stirring to thereby prepare a polyamide resin composition (128), and the physical properties thereof were measured in the same manners as in Example 101. Further, a film was produced in the same manners as in Example 101, except that the polyamide resin composition (128) was used, and it was evaluated. The results thereof are shown in Tables 1 and 2.

Comparative Example 109

Melt polymerization and pelletization were carried out in the same manners as in Example 101 to obtain about 24 kg of polyamide, except that in preparation of the polyamide in Example 101, an addition amount of sodium hypophosphite monohydrate was changed to 12,980 mg (122.4 mmol, 150 ppm in terms of a phosphorus atom concentration in the polyamide); an addition amount of sodium acetate was changed to 6,193 mg (75.49 mmol, 0.62 in terms of a mole number ratio based on sodium hypophosphite monohydrate); and an addition amount of metaxylylenediamine was changed to 13,839 g (101.6 mol). Then, solid phase polymerization was carried out in the same manner as in Example 101 to obtain polyamide (X112).

Sodium acetate trihydrate 1,600 mg (800 ppm to the polyamide) was added to 2 kg of the polyamide (X112) obtained above and mixed by stirring to thereby prepare a polyamide resin composition (129), and the physical properties thereof were measured in the same manners as in Example 101. Further, a film was produced in the same manners as in Example 101, except that the polyamide resin composition (129) was used, and it was evaluated. The results thereof are shown in Tables 1 and 2.

Comparative Example 110

Melt polymerization and pelletization were carried out in the same manners as in Example 101 to obtain about 24 kg of polyamide, except that in preparation of the polyamide in Example 101, an addition amount of sodium hypophosphite monohydrate was changed to 21,630 mg (204.1 mmol, 250 ppm in terms of a phosphorus atom concentration in the polyamide); an addition amount of sodium acetate was changed to 10,320 mg (125.8 mmol, 0.62 in terms of a mole number ratio based on sodium hypophosphite monohydrate); and an addition amount of metaxylylenediamine was changed to 13,916 g (102.2 mol). Then, solid phase polymerization was carried out in the same manner as in Example 101 to obtain polyamide (X113).

Sodium acetate trihydrate 3,000 mg (1,500 ppm to the polyamide) was added to 2 kg of the polyamide (X113) obtained above and mixed by stirring to thereby prepare a polyamide resin composition (130), and the physical properties thereof were measured in the same manners as in Example 101. Further, a film was produced in the same manners as in Example 101, except that the polyamide resin composition (130) was used, and it was evaluated. The results thereof are shown in Tables 1 and 2.

Comparative Example 111

A polyamide resin composition (131) was prepared in the same manners as in Example 106, except that an addition amount of sodium acetate trihydrate to the polyamide (X103) in Example 106 was changed to 3,000 mg (1,500 ppm to the polyamide), and the physical properties thereof were measured. Further, a film was produced in the same manners as in Example 101, except that the polyamide resin composition (131) was used, and it was evaluated. The results thereof are shown in Tables 1 and 2.

Comparative Example 112

Sodium acetate 200 mg (100 ppm to the polyamide) dissolved in 5 ml of distilled warm water was added to 2 kg of the polyamide (X103) obtained in Example 106 and mixed by stirring to thereby prepare a polyamide resin composition (132), and the physical properties thereof were measured in the same manner as in Example 101. Further, a film was produced in the same manners as in Example 101, except that the polyamide resin composition (132) was used, and it was evaluated. The results thereof are shown in Tables 1 and 2.

Comparative Example 113

A polyamide resin composition (133) was prepared in the same manners as in Comparative Example 112, except that an addition amount of sodium acetate trihydrate to the polyamide (X103) in Comparative Example 112 was changed to 1,600 mg (800 ppm to the polyamide), and the physical properties thereof were measured. Further, a film was produced in the same manner as in Example 101, except that the polyamide resin composition (133) was used, and it was evaluated. The results thereof are shown in Tables 1 and 2.

Comparative Example 114

Sodium carbonate decahydrate 400 mg (200 ppm to the polyamide) was added to 2 kg of the polyamide (X103) obtained in Example 106 and mixed by stirring to thereby prepare a polyamide resin composition (134), and the physical properties thereof were measured in the same manners as in Example 101. Further, a film was produced in the same manner as in Example 101, except that the polyamide resin composition (134) was used, and it was evaluated. The results thereof are shown in Tables 1 and 2.

Comparative Example 115

A polyamide resin composition (135) was prepared in the same manner as in Comparative Example 114, except that an addition amount of sodium carbonate decahydrate to the polyamide (X103) in Comparative Example 115 was changed to 3,000 mg (1,500 ppm to the polyamide), and the physical properties thereof were measured. Further, a film was produced in the same manner as in Example 101, except that the polyamide resin composition (135) was used, and it was evaluated. The results thereof are shown in Tables 1 and 2.

Example 123

A double shaft extruding equipment (model: TEM37BS, bore diameter: 37 mmϕ, manufactured by Toshiba Machine Co., Ltd.) equipped with a strand die was used to supply the polyamide (X103) obtained in Example 106 at a discharge velocity of 28.8 kg/hour and sodium acetate trihydrate at a discharge velocity of 1.2 kg/hour respectively by different feeders to turn the polyamide into a strand form. Next, it was cooled in a water-cooled bath and then pelletized by means of a pelletizer. Thereafter, the pellets were dried at 0.1 Torr or less and 140° C. for 8 hours to obtain polyamide master batch (Y101).

The polyamide (X103) 1,980.0 g and the polyamide master batch (Y101) 20.0 g were mixed to thereby prepare a polyamide resin composition (136), and the physical properties thereof were measured in the same manners as in Example 101. Further, a film was produced in the same manners as in Example 101, except that the polyamide resin composition (136) was used, and it was evaluated. The results thereof are shown in Tables 3 and 4.

Example 124

A polyamide resin composition (137) was prepared in the same manners as in Comparative Example 123, except that the blend amounts of the polyamide (X103) and the polyamide master batch (Y101) in Example 123 were changed to 1,970.0 g of the polyamide (X103) and 30.0 g of the polyamide master batch (Y101) respectively, and the physical properties thereof were measured. Further, a film was produced in the same manner as in Example 101, except that the polyamide resin composition (137) was used, and it was evaluated. The results thereof are shown in Tables 3 and 4.

Example 125

A polyamide resin composition (138) was prepared in the same manners as in Comparative Example 123, except that the blend amounts of the polyamide (X103) and the polyamide master batch (Y101) in Example 123 were changed to 1,960.0 g of the polyamide (X103) and 40.0 g of the polyamide master batch (Y101) respectively, and the physical properties thereof were measured. Further, a film was produced in the same manners as in Example 101, except that the polyamide resin composition (138) was used, and it was evaluated. The results thereof are shown in Tables 3 and 4.

Abbreviated expressions in Tables show the followings.
AcNa: Sodium acetate
AcNa.3H$_2$O: Sodium acetate trihydrate
Na$_2$CO$_3$.10H$_2$O: Sodium carbonate decahydrate
AcLi.2H$_2$O: Lithium acetate dihydrate
AcK: Potassium acetate

TABLE 1

|  | Alkali compound (A) | [ppm] (*) | [COOH]—[NH$_2$] [μeq/g] | P [μmol/g] | M [μmol/g] | M/P |
|---|---|---|---|---|---|---|
| Example 101 | AcNa · 3H$_2$O | 75 | 42.6 | 0.97 | 2.15 | 2.2 |
| Example 102 | AcNa · 3H$_2$O | 75 | 50.1 | 0.97 | 2.04 | 2.1 |
| Example 103 | AcNa · 3H$_2$O | 100 | 50.1 | 0.97 | 2.30 | 2.4 |
| Example 104 | AcNa · 3H$_2$O | 150 | 42.6 | 0.97 | 2.61 | 2.7 |
| Example 105 | AcNa · 3H$_2$O | 150 | 50.1 | 0.97 | 2.66 | 2.7 |
| Example 106 | AcNa · 3H$_2$O | 300 | 45.7 | 4.84 | 10.01 | 2.1 |
| Example 107 | AcNa · 3H$_2$O | 350 | 45.7 | 4.84 | 10.19 | 2.1 |
| Example 108 | AcNa · 3H$_2$O | 500 | 45.7 | 4.84 | 11.48 | 2.4 |
| Example 109 | AcNa · 3H$_2$O | 800 | 45.7 | 4.84 | 13.60 | 2.8 |
| Example 110 | AcNa · 3H$_2$O | 800 | 64.5 | 4.84 | 13.33 | 2.8 |
| Example 111 | AcNa · 3H$_2$O | 800 | 73.0 | 4.84 | 13.20 | 2.7 |
| Example 112 | AcNa · 3H$_2$O | 800 | 15.5 | 4.84 | 13.27 | 2.7 |
| Example 113 | AcNa · 3H$_2$O | 800 | 22.1 | 4.84 | 13.54 | 2.8 |
| Example 114 | AcNa · 3H$_2$O | 900 | 45.7 | 4.84 | 14.39 | 3.0 |
| Example 115 | AcNa · 3H$_2$O | 400 | 49.3 | 5.81 | 12.23 | 2.1 |
| Example 116 | AcNa · 3H$_2$O | 1000 | 49.3 | 5.81 | 16.50 | 2.8 |
| Example 117 | AcNa | 200 | 45.7 | 4.84 | 10.09 | 2.1 |
| Example 118 | AcNa | 500 | 45.7 | 4.84 | 13.65 | 2.8 |
| Example 119 | Na$_2$CO$_3$ · 10H$_2$O | 350 | 45.7 | 4.84 | 10.01 | 2.1 |
| Example 120 | Na$_2$CO$_3$ · 10H$_2$O | 800 | 45.7 | 4.84 | 13.30 | 2.7 |
| Example 121 | AcLi · 2H$_2$O | 1000 | 45.7 | 4.84 | 12.84 | 2.7 |
| Example 122 | AcK | 300 | 45.7 | 4.84 | 13.30 | 2.7 |
| Comparative Example 101 | Not added | — | 50.1 | 0.97 | 1.56 | 1.6 |
| Comparative Example 102 | Not added | — | 45.7 | 4.84 | 7.80 | 1.6 |
| Comparative Example 103 | AcNa · 3H$_2$O | 25 | 50.1 | 0.97 | 1.69 | 1.7 |
| Comparative Example 104 | AcNa · 3H$_2$O | 150 | 45.7 | 4.84 | 8.78 | 1.8 |
| Comparative Example 105 | AcNa · 3H$_2$O | 150 | 9.7 | 0.97 | 2.54 | 2.6 |
| Comparative Example 106 | AcNa · 3H$_2$O | 150 | 80.8 | 0.97 | 2.60 | 2.7 |
| Comparative Example 107 | AcNa · 3H$_2$O | 350 | 50.1 | 0.97 | 4.00 | 4.1 |
| Comparative Example 108 | AcNa · 3H$_2$O | 800 | 7.4 | 4.84 | 13.22 | 2.7 |
| Comparative Example 109 | AcNa · 3H$_2$O | 800 | 89.1 | 4.84 | 13.48 | 2.8 |

TABLE 1-continued

|  | Alkali compound (A) | [ppm] (*) | [COOH]—[NH$_2$] [μeq/g] | P [μmol/g] | M [μmol/g] | M/P |
|---|---|---|---|---|---|---|
| Comparative Example 110 | AcNa · 3H$_2$O | 1500 | 55.2 | 8.07 | 23.79 | 2.9 |
| Comparative Example 111 | AcNa · 3H$_2$O | 1500 | 45.7 | 4.84 | 18.65 | 3.9 |
| Comparative Example 112 | AcNa | 100 | 45.7 | 4.84 | 8.88 | 1.8 |
| Comparative Example 113 | AcNa | 800 | 45.7 | 4.84 | 17.09 | 3.5 |
| Comparative Example 114 | Na$_2$CO$_3$ · 10H$_2$O | 200 | 45.7 | 4.84 | 9.04 | 1.9 |
| Comparative Example 115 | Na$_2$CO$_3$ · 10H$_2$O | 1500 | 45.7 | 4.84 | 18.11 | 3.7 |

(*) Concentration of the alkali compound (A) to the polyamide
P: Mole concentration of a phosphorus atom contained per 1 gram of the polyamide resin composition
M: Total mole concentration of an alkali metal atom and an alkaline earth metal atom each contained per 1 gram of the polyamide resin composition

TABLE 2

|  | Resin pressure average value [MPa] | | | Fish eye number of film [/m$^2$] | Appearance of film | Gel fraction [%] | | |
|---|---|---|---|---|---|---|---|---|
|  | Immediately after starting | 3 hr | 6 hr |  |  | 270° C. 72 hr stay | 290° C. 24 hr stay | 290° C. 36 hr stay |
| Example 101 | 2.2 | 2.2 | 2.2 | 300 | Good | 13.1 | 15.1 | 23.9 |
| Example 102 | 2.2 | 2.2 | 2.2 | 350 | Good | 13.6 | 14.1 | 22.7 |
| Example 103 | 2.0 | 2.0 | 2.0 | 320 | Good | 8.2 | 8.9 | 12.9 |
| Example 104 | 2.0 | 2.0 | 2.0 | 310 | Good | 5.5 | 6.7 | 10.2 |
| Example 105 | 2.0 | 2.0 | 2.0 | 360 | Good | 5.0 | 6.1 | 9.6 |
| Example 106 | 2.0 | 2.0 | 2.0 | 420 | Good | 16.6 | 17.2 | 26.2 |
| Example 107 | 2.0 | 2.0 | 2.0 | 350 | Good | 12.9 | 15.0 | 24.6 |
| Example 108 | 1.9 | 1.9 | 1.9 | 360 | Good | 1.2 | 0.9 | 2.1 |
| Example 109 | 1.9 | 1.9 | 1.9 | 620 | Good | 1.1 | 1.2 | 2.4 |
| Example 110 | 1.9 | 1.9 | 2.0 | 710 | Good | 3.3 | 3.2 | 6.8 |
| Example 111 | 1.9 | 2.0 | 2.0 | 880 | Good | 7.4 | 7.9 | 12.4 |
| Example 112 | 1.9 | 1.9 | 2.0 | 800 | Good | 15.1 | 14.2 | 19.6 |
| Example 113 | 1.9 | 1.9 | 2.0 | 720 | Good | 8.1 | 9.1 | 14.1 |
| Example 114 | 1.9 | 1.9 | 2.0 | 770 | Good | 0.5 | 0.9 | 4.4 |
| Example 115 | 2.0 | 2.0 | 2.0 | 500 | Good | 7.2 | 8.8 | 13.3 |
| Example 116 | 1.8 | 1.9 | 1.9 | 680 | Good | 1.2 | 0.7 | 1.2 |
| Example 117 | 2.0 | 2.0 | 2.0 | 390 | Good | 10.4 | 12.2 | 20.1 |
| Example 118 | 1.9 | 1.9 | 1.9 | 650 | Good | 0.6 | 1.4 | 2.9 |
| Example 119 | 2.0 | 2.0 | 2.0 | 440 | Good | 11.1 | 13.1 | 21.1 |
| Example 120 | 1.9 | 1.8 | 1.8 | 660 | Good | 0.5 | 0.5 | 0.5 |
| Example 121 | 1.8 | 1.8 | 1.8 | 600 | Good | 10.9 | 12.7 | 16.5 |
| Example 122 | 1.9 | 1.9 | 1.9 | 430 | Good | 3.4 | 1.9 | 5.5 |
| Comparative Example 101 | 2.3 | 2.3 | 2.3 | 320 | Good | 31.0 | 35.5 | 55.1 |
| Comparative Example 102 | 2.3 | 2.3 | 2.3 | 320 | Good | 32.9 | 36.2 | 54.3 |
| Comparative Example 103 | 2.3 | 2.3 | 2.3 | 320 | Good | 25.2 | 25.1 | 39.9 |
| Comparative Example 104 | 2.0 | 2.0 | 2.1 | 350 | Good | 20.3 | 19.9 | 30.1 |
| Comparative Example 105 | 2.0 | 2.0 | 2.0 | 790 | Yellowish | 25.6 | 26.1 | 36.9 |
| Comparative Example 106 | 2.0 | 2.0 | 2.0 | 1210 | Irregularities | 9.2 | 8.9 | 15.5 |
| Comparative Example 107 | 2.0 | 2.0 | 2.0 | 480 | Yellowish | 20.9 | 21.4 | 30.0 |
| Comparative Example 108 | 1.9 | 1.9 | 2.0 | 1250 | Yellowish, irregularities | 13.7 | 15.1 | 18.4 |
| Comparative Example 109 | 1.9 | 1.9 | 2.0 | 1900 | Irregularities | 18.8 | 19.2 | 29.1 |
| Comparative Example 110 | 1.8 | 2.3 | 2.7 | 940 | Irregularities | 0.9 | 1.1 | 4.3 |
| Comparative Example 111 | 1.9 | 2.0 | 2.0 | 1080 | Irregularities | 0.4 | 1.7 | 3.5 |
| Comparative Example 112 | 2.0 | 2.0 | 2.0 | 330 | Good | 23.9 | 22.2 | 36.2 |
| Comparative Example 113 | 1.8 | 1.8 | 1.8 | 920 | Irregularities | 1.2 | 2.3 | 6.6 |

TABLE 2-continued

|  | Resin pressure average value [MPa] | | | Fish eye number of film [/m²] | Appearance of film | Gel fraction [%] | | |
|  | --- | --- | --- | --- | --- | --- | --- | --- |
|  | Immediately after starting | 3 hr | 6 hr | | | 270° C. 72 hr stay | 290° C. 24 hr stay | 290° C. 36 hr stay |
| Comparative Example 114 | 2.0 | 2.0 | 2.0 | 400 | Good | 20.9 | 21.2 | 30.8 |
| Comparative Example 115 | 1.9 | 1.9 | 1.9 | 1040 | Irregularities | 0.3 | 1.4 | 2.2 |

TABLE 3

| | Alkali compound (A) | [COOH]—[NH$_2$] [µeq/g] | Mass ratio of polyamide (X)/alkali compound (A) in master batch (Y) | Mass ratio of master batch (Y)/polyamide (X) in resin composition | P [µmol/g] | M [µmol/g] | M/P |
| --- | --- | --- | --- | --- | --- | --- | --- |
| Example 123 | AcNa · 3H$_2$O | 45.7 | 96/4 | 99.0/1.0 | 4.84 | 10.66 | 2.2 |
| Example 124 | AcNa · 3H$_2$O | 45.7 | 96/4 | 98.5/1.5 | 4.84 | 12.10 | 2.5 |
| Example 125 | AcNa · 3H$_2$O | 45.7 | 96/4 | 98.0/2.0 | 4.84 | 13.51 | 2.8 |

P: Mole concentration of a phosphorus atom contained per 1 gram of the polyamide resin composition
M: Total mole concentration of an alkali metal atom and an alkaline earth metal atom each contained per 1 gram of the polyamide resin composition

TABLE 4

|  | Resin pressure average value [MPa] | | | Fish eye number of film [/m²] | Appearance of film | Gel fraction [%] | | |
|  | --- | --- | --- | --- | --- | --- | --- | --- |
|  | Immediately after starting | 3 hr | 6 hr | | | 270° C. 72 hr stay | 290° C. 24 hr stay | 290° C. 36 hr stay |
| Example 123 | 2.1 | 2.1 | 2.1 | 360 | Good | 11.9 | 13.9 | 20.1 |
| Example 124 | 2.0 | 2.0 | 2.0 | 360 | Good | 1.4 | 2.9 | 6.7 |
| Example 125 | 1.9 | 1.9 | 1.9 | 530 | Good | 0.5 | 0.6 | 3.3 |

In Comparative Examples 101 and 102 in which the alkali compound (A) was not added after producing the polyamide, a fish eye number of the films was small at first, but the gel fraction was high, and gels were produced when the excessive thermal history was applied by staying.

In contrast with this, the polyamide resin compositions of the present invention having 10 to 80 of a difference ([COOH]—[NH$_2$]) of a terminal carboxyl group concentration from a terminal amino group concentration in the polyamide, 0.32 µmol/g or more and less than 6.46 µmol/g of a mole concentration P of a phosphorus atom contained per g of the polyamide resin composition, 0.50 µmol/g or more and less than 17.00 µmol/g of a total mole concentration M of an alkali metal atom and an alkaline earth metal atom each contained per g of the polyamide resin composition and 2 to 3 of M/P have a good color tone and are reduced in a fish eye number in the film, and they have a low gel fraction and produce less gel in mold processing.

On the other hand, the polyamide resin compositions prepared in Comparative Examples 103 to 115 in which the values of a difference ([COOH]—[NH$_2$]) of a terminal carboxyl group concentration from a terminal amino group concentration in the polyamide, a mole concentration P of a phosphorus atom contained, a total mole concentration M of an alkali metal atom and an alkaline earth metal atom and M/P deviated from the ranges described above brought about the problems of an inferior appearance of the films and production of gels.

Production Example 201

Production of Polyamide (X201)

A reaction vessel having a content volume of 50 liter equipped with a stirrer, a partial condenser, a full condenser, a thermometer, a dropping funnel, a nitrogen introducing tube and a strand die was charged with 15,000 g (102.6 mole) of adipic acid precisely weighed, 12.977 g (0.122 mol, 150 ppm in terms of a phosphorus atom concentration in the polyamide) of sodium hypophosphite monohydrate (NaH$_2$PO$_2$.H$_2$O) and 7.0303 g (0.0857 mol, 0.70 in terms of a mole number ratio based on sodium hypophosphite monohydrate) of sodium acetate and sufficiently substituted with nitrogen, and then the vessel was heated up to 170° C. while stirring an inside of the system under a small amount of nitrogen flow. Metaxylylenediamine 13,928 g (102.26 mol) was dropwise added thereto while stirring, and an inside of the system was continuously heated while removing condensation water produced to an outside of the system. After finishing dropwise adding metaxylylenediamine, the internal temperature was controlled to 260° C. to continue the reaction for 40 minutes. Then, an inside of the system was pressurized by nitrogen to take out the polymer from the strand die, and this was pelletized to obtain about 24 kg of polyamide.

Next, a jacket-equipped tumble dryer in which a nitrogen gas introducing tube, a vacuum line, a vacuum pump and a thermocouple for measuring an inner temperature were provided was charged with the polyamide described above, and an inside of the tumble dryer was sufficiently substituted with nitrogen having a purity of 99% by volume or more while rotating it at a fixed speed. Then, the tumble dryer was heated under nitrogen gas flow, and the pellet temperature was elevated up to 150° C. in about 150 minutes. When the pellet temperature reached 150° C., a pressure in the system was reduced to 1 Torr or less. The temperature was further continued to be elevated, and after the pellet temperature was elevated up to 200° C. in about 70 minutes, the system was maintained at 200° C. for 30 to 45 minutes. Then, a nitrogen gas having a purity of 99% by volume or more was introduced into the system, and the tumble dryer was cooled while rotating to obtain polyamide (X201).

Production Examples 202 to 221

Production of Polyamides (X202) to (X221)

Polyamides (X202) to (X221) were synthesized in the same manners as in Production Example 201, except that the amounts of metaxylylenediamine, sodium hypophosphite monohydrate and sodium acetate were changed to amounts shown in Table 5. In Example 213, the amidation reaction in the polymerization was slow, and it was difficult to carry out the polymerization, so that polyamide (X213) could not be obtained.

The required amounts of polyamide resins necessary for the following examples and comparative examples were secured by repeating the same production.

Production Example 222

Production of Polyamide Master Batch (Y201)

The polyamide (X214) 4,960 g and sodium acetate trihydrate 66.36 g (anhydride equivalent to 40 g) were molten and kneaded at 260° C. by means of a double shaft extruding equipment (model: TEM37B, manufactured by Toshiba Machine Co., Ltd.) to obtain a polyamide master batch (Y201). Hydrated moisture of sodium acetate trihydrate was removed in the melt-kneading by vacuum ventilation.

Production Examples 223 to 228

Production Polyamide Master Batches (Y202) to (Y207)

Polyamide master batches (Y202) to (Y207) were obtained in the same manners as in Production Example 222, except that the polyamide (X) and sodium acetate trihydrate were used in kinds and blend amounts shown in Table 6.

TABLE 5

| Production Example | Polyamide (X) | MXDA drop amount [g] | (B) add amount [g] | (C) add amount [g] | (C)/(B) mole ratio | [COOH]—[NH$_2$] in polyamide (X) [µeq/g] | In polyamide (X) P atom concentration [ppm] | Na metal concentration [µmol/g] |
|---|---|---|---|---|---|---|---|---|
| 201 | X201 | 13928 | 12.977 | 7.030 | 0.7 | 30 | 150 | 8.233 |
| 202 | X202 | 13895 | 13.842 | 7.499 | 0.7 | 50 | 160 | 8.782 |
| 203 | X203 | 13895 | 15.572 | 8.436 | 0.7 | 50 | 180 | 9.879 |
| 204 | X204 | 13895 | 0.865 | 0.469 | 0.7 | 50 | 10 | 0.549 |
| 205 | X205 | 13895 | 1.471 | 0.797 | 0.7 | 50 | 17 | 0.933 |
| 206 | X206 | 13895 | 1.817 | 0.984 | 0.7 | 50 | 21 | 1.153 |
| 207 | X207 | 13945 | 8.651 | 4.687 | 0.7 | 20 | 100 | 5.489 |
| 208 | X208 | 13945 | 17.302 | 9.374 | 0.7 | 20 | 200 | 10.977 |
| 209 | X209 | 13945 | 14.707 | 5.691 | 0.5 | 20 | 170 | 8.233 |
| 210 | X210 | 13945 | 14.707 | 6.829 | 0.6 | 20 | 170 | 8.782 |
| 211 | X211 | 13868 | 15.572 | 10.847 | 0.9 | 65 | 180 | 11.042 |
| 212 | X212 | 13868 | 15.572 | 12.052 | 1.0 | 65 | 180 | 11.623 |
| 213 | X213 | 13868 | 15.572 | 14.462 | 1.2 | Not evaluated due to difficulty of polymerization | | |
| 214 | X214 | 13868 | 13.409 | 6.746 | 0.65 | 65 | 155 | 8.257 |
| 215 | X215 | 13955 | 17.302 | 8.704 | 0.65 | 15 | 200 | 10.654 |
| 216 | X216 | 13955 | 13.409 | 6.746 | 0.65 | 15 | 155 | 8.257 |
| 217 | X217 | 13851 | 2.595 | 1.306 | 0.65 | 75 | 30 | 1.598 |
| 218 | X218 | 13851 | 13.409 | 6.746 | 0.65 | 75 | 155 | 8.257 |
| 219 | X219 | 13851 | 12.977 | 6.528 | 0.65 | 75 | 150 | 7.991 |
| 220 | X220 | 13851 | 13.842 | 6.963 | 0.65 | 75 | 160 | 8.523 |
| 221 | X221 | 13971 | 13.842 | 6.963 | 0.65 | 5 | 160 | 8.523 |

MXDA: metaxylylenediamine (B): phosphorus atom-containing compound (NaH$_2$PO$_2$ · H$_2$O)

(C): alkali metal compound (CH$_3$COONa)

TABLE 6

| Master batch (Y) | Composition | | | | In master batch (Y) | | |
|---|---|---|---|---|---|---|---|
| | Polyamide (X) | | Alkai compound (A) [1] | | Mass ratio of | | |
| | Kind | Add amount [g] | Kind | Add amount [g] | AcNa-equivalent mass [g] | polyamide (X)/ alkali compound (A) [2] | Na metal concentration [μmol/g] | P atom concentration [ppm] |
| Y201 | X214 | 4960 | AcNa · 3H$_2$O | 66.36 | 40 | 99.2/0.8 | 105.7 | 4.964 |
| Y202 | X214 | 4910 | AcNa · 3H$_2$O | 149.30 | 90 | 98.2/1.8 | 227.5 | 4.914 |
| Y203 | X215 | 4900 | AcNa · 3H$_2$O | 165.89 | 100 | 98.0/2.0 | 254.3 | 6.328 |
| Y204 | X216 | 4950 | AcNa · 3H$_2$O | 82.95 | 50 | 99.0/1.0 | 130.1 | 4.954 |
| Y205 | X216 | 4600 | AcNa · 3H$_2$O | 663.56 | 400 | 92.0/8.0 | 982.8 | 4.604 |
| Y206 | X217 | 4500 | AcNa · 3H$_2$O | 829.45 | 500 | 90.0/10.0 | 1220.5 | 0.872 |
| Y207 | X218 | 4800 | AcNa · 3H$_2$O | 331.78 | 200 | 96.0/4.0 | 495.6 | 4.804 |

[1] Mass of alkali compound (A) was calculated as an anhydrous salt equivalent mass, when alkali compound (A) is a hydrate salt.
[2] Mass ratio of alkali compound (A) in master batch (Y) was calculated by reducing mass of alkali compound (A) to an anhydrous salt equivalent mass, when alkali compound (A) is a hydrate salt.

Example 201

Sodium acetate 3.0 g was added to 20 kg of the polyamide (X201), and the mixture was stirred and mixed to obtain a polyamide resin composition. The polyamide resin composition thus obtained was used to produce a three layer preform comprising a polyester layer/a barrier layer/a polyester layer.

Polyethylene terephthalate (trade name: RT543C, manufactured by Japan Unipet Co., Ltd.) having an intrinsic viscosity of 0.75 (measured at 30° C. in a mixed solvent of phenol/tetrachloroethane=6/4 (mass ratio)) was used for the polyester layer, and a polyamide resin composition described in Table 7 was used for the gas-barrier layer.

The three layer preform has a shape of a whole length: 95 mm, a major diameter: 22 mm and a wall thickness: 4.2 mm, and it was produced by means of an injection molding machine (model: M200, manufactured by Meiki Co., Ltd.) having two injection cylinders and a metal die (four articles molded per shot, manufactured by Kata Systems Company).

The molding conditions of the three layer preform are shown below, and in order to accelerate degradation of the resin, an injection cylinder temperature at a core side (barrier layer side) and a resin flow channel temperature in an inside of the metal die were set to higher levels than usual.

Injection cylinder temperature at a skin side: 280° C.
Injection cylinder temperature at a core side: 290° C.
Resin flow channel temperature in an inside of the metal die: 290° C.
Die metal cooling water temperature: 15° C.
Proportion of the barrier resin in the preform: 5% by mass
Cycle time: 40 seconds

Examples 202 to 215

Multilayer preforms were produced in the same manners as in Example 201, except that the polyamide (X) and sodium acetate were used in kinds and blend amounts shown in Table 7.

Example 216

The polyamide (X211) 19.5 kg and the polyamide master batch (Y201) 0.5 kg were stirred and mixed to obtain a polyamide resin composition. The polyamide resin composition thus obtained was used to produce a multilayer preform.

Examples 217 to 223

Multilayer preforms were produced in the same manners as in Example 216, except that the polyamide master batches (Y) were used in kinds and blend amounts shown in Table 7.

Comparative Example 201

A preform was planned to be produced by using the polyamide (X213) as the polyamide (X), but the polyamide (X213) could not be obtained in Production Example 213 and therefore was given up.

Comparative Examples 202 to 204

Multilayer preforms were produced in the same manners as in Example 201, except that the polyamide (X) and sodium acetate were used in kinds and blend amounts shown in Table 7.

The preforms produced in Comparative Example 202 and Comparative Example 204 had a good stability but generated a lot of burnt deposits. In Comparative Example 203, the weighing time in the injection molding was long, and the present positions of the barrier layer in the preform were scattered. The stable preform could not be obtained, and therefore the burnt deposits were not evaluated.

TABLE 7

| | Composition of polyamide resin composition | | | | Mass ratio of master batch (Y)/ polyamide (X) in resin composition | Properties of polyamide resin composition | | | | Evaluation of preform | | |
|---|---|---|---|---|---|---|---|---|---|---|---|---|
| | Polyamide (X) | | AcNa | Master batch (Y) | | | Na metal Concentration M | P atom Concentration P | | M/P mole ratio | Number of preform having burnt deposits | PFM stability | Weighing time |
| | Kind | [g] | [g] | Kind | [g] | | [μmol/g] | [μmol/g] | [ppm] | | | | [sec] |
| Example 201 | X201 | 20000 | 3 | — | 0 | — | 10.06 | 4.84 | 149.98 | 2.1 | 1 | good | 5 |
| Example 202 | X201 | 20000 | 6 | — | 0 | — | 11.89 | 4.84 | 149.96 | 2.5 | 0 | good | 6 |
| Example 203 | X201 | 20000 | 6.6 | — | 0 | — | 12.25 | 4.84 | 149.95 | 2.5 | 1 | good | 6 |
| Example 204 | X201 | 20000 | 10.3 | — | 0 | — | 14.50 | 4.84 | 149.92 | 3.0 | 4 | good | 8 |
| Example 205 | X202 | 20000 | 11 | — | 0 | — | 15.48 | 5.16 | 159.91 | 3.0 | 5 | good | 10 |
| Example 206 | X203 | 20000 | 11.5 | — | 0 | — | 16.88 | 5.81 | 179.90 | 2.9 | 6 | good | 12 |
| Example 207 | X204 | 20000 | 0.5 | — | 0 | — | 0.85 | 0.32 | 10.00 | 2.7 | 5 | good | 4 |
| Example 208 | X205 | 20000 | 0.5 | — | 0 | — | 1.24 | 0.55 | 17.00 | 2.3 | 3 | good | 4 |
| Example 209 | X206 | 20000 | 1.3 | — | 0 | — | 1.94 | 0.68 | 21.00 | 2.9 | 3 | good | 4 |
| Example 210 | X207 | 20000 | 6.8 | — | 0 | — | 9.63 | 3.23 | 99.97 | 3.0 | 1 | good | 6 |
| Example 211 | X208 | 20000 | 9.8 | — | 0 | — | 16.94 | 6.45 | 199.90 | 2.6 | 5 | good | 7 |
| Example 212 | X209 | 20000 | 12 | — | 0 | — | 15.54 | 5.49 | 169.90 | 2.8 | 5 | good | 12 |
| Example 213 | X210 | 20000 | 12 | — | 0 | — | 16.09 | 5.49 | 169.90 | 2.9 | 6 | good | 12 |
| Example 214 | X211 | 20000 | 9 | — | 0 | — | 16.52 | 5.81 | 179.92 | 2.8 | 5 | good | 7 |
| Example 215 | X212 | 20000 | 8.5 | — | 0 | — | 16.80 | 5.81 | 179.92 | 2.9 | 5 | good | 6 |
| Example 216 | X211 | 19500 | 0 | Y201 | 500 | 2.5/97.5 | 10.69 | 5.00 | 154.97 | 2.1 | 1 | good | 4 |
| Example 217 | X211 | 19800 | 0 | Y202 | 200 | 1/99 | 10.45 | 5.00 | 154.97 | 2.1 | 2 | good | 4 |
| Example 218 | X211 | 19600 | 0 | Y203 | 400 | 2/98 | 15.53 | 6.45 | 199.92 | 2.4 | 5 | good | 4 |
| Example 219 | X211 | 19000 | 0 | Y204 | 1000 | 5/95 | 14.35 | 5.00 | 154.92 | 2.9 | 3 | good | 4 |
| Example 220 | X211 | 19900 | 0 | Y205 | 100 | 0.5/99.5 | 13.13 | 5.00 | 154.94 | 2.6 | 1 | good | 4 |
| Example 221 | X211 | 19980 | 0 | Y206 | 20 | 0.1/99.9 | 2.82 | 0.97 | 30.00 | 2.9 | 1 | good | 4 |
| Example 222 | X211 | 19750 | 0 | Y207 | 250 | 1.25/98.75 | 14.35 | 5.00 | 154.92 | 2.9 | 5 | good | 4 |
| Example 223 | X211 | 19920 | 0 | Y207 | 80 | 0.4/99.6 | 10.21 | 5.00 | 154.98 | 2.0 | 2 | good | 4 |
| Comparative Example 201 | X213 | 20000 | 0 | — | 0 | — | — | — | — | — | Not evaluated due to difficulty of polymerization | | |
| Comparative Example 202 | X219 | 20000 | 0 | — | 0 | — | 7.99 | 4.84 | 150.00 | 1.7 | 20 | good | 4 |
| Comparative Example 203 | X220 | 20000 | 20 | — | 0 | — | 20.69 | 5.17 | 160.00 | 4.0 | — | Disturbed | 30 |
| Comparative Example 204 | X221 | 20000 | 10 | — | 0 | — | 14.61 | 5.17 | 160.00 | 2.8 | 21 | good | 8 |

As apparent from the results obtained in the examples and the comparative examples, the multilayer molded articles of the present invention provided less burnt deposit and had a good productivity.

INDUSTRIAL APPLICABILITY

The polyamide resin composition of the present invention is excellent in a gas-barrier property and a transparency and has a good color tone, and in addition thereto, it has less number of fish eyes in the film and a low gel fraction and produces less gel in mold processing. Accordingly, the polyamide resin composition of the present invention is industrially useful as a packaging material, a gasoline-barrier material, a fiber material and the like. Also, the multilayer molded article of the present invention provides less burnt deposit and has a very high industrial value as a multilayer bottle and the like.

The invention claimed is:

1. A process for producing a polyamide resin composition comprising:
(a) polycondensating a diamine comprising 70 mol % or more of metaxylylenediamine and dicarboxylic acid in the presence of a phosphorus atom-comprising compound (B), to obtain a polyamide (X); and
(b) adding an alkali compound (A) which is at least one selected to the polyamide (X) to form the polyamide resin composition, wherein the alkali compound (A) is at least one selected from the group consisting of sodium acetate, sodium acetate trihydrate, sodium carbonate decahydrate, lithium acetate dihydrate, and potassium acetate,
wherein the polyamide resin composition, comprises:
the polyamide (X) comprising a diamine unit comprising 70 mol % or more of a metaxylylenediamine unit and a dicarboxylic acid unit; and
the alkali compound (A),
wherein the polyamide resin composition produced satisfies equations (1) to (4):

$$10 \leq ([COOH]-[NH_2]) \leq 80 \quad (1)$$

$$0.32 \leq P < 6.46 \quad (2)$$

$$0.50 \leq M < 17.00 \quad (3)$$

$$2.1 \leq M/P \leq 3.0 \quad (4)$$

wherein [COOH] is a concentration (μeq/g) of a terminal carboxyl group in the polyamide (X);
[NH$_2$] is a concentration (μeq/g) of a terminal amino group in the polyamide (X);
P is a mole concentration (μmol/g) of a phosphorus atom contained per gram of the polyamide resin composition; and
M is a sum (μmol/g) of values obtained by multiplying a mole concentration of an alkali metal atom and a mole concentration of an alkaline earth metal atom each contained per gram of the polyamide resin composition by valencies thereof, respectively, for each alkali metal atom and each alkaline earth metal atom present in the polyamide resin composition.

2. The process of claim 1, wherein, in (a), the polycondensation is carried out in the presence of the phosphorus atom-comprising compound (B) and an alkali metal compound (C) which may be the same or different from alkali compound (A).

3. The process of claim 2, wherein an amount of the alkali metal compound (C) is in a range of 0.5 to 1 in terms of a value obtained by dividing a mole number of the alkali metal compound (C) by a mole number of the phosphorus atom-comprising compound (B).

4. The process according to claim 2, wherein the alkali metal compound (C) is at least one selected from the group consisting of alkali metal hydroxides and alkali metal acetic acid salts.

5. The process of claim 1, wherein the adding (b) comprises:
(b1) melting and kneading 90 to 99 parts by mass of the polyamide (X) and 10 to 1 part by mass of the alkali compound (A) with an extrusion equipment to obtain a polyamide master batch (Y); and
(b2) melting and kneading 0.1 to 20 parts by mass of the polyamide master batch (Y) and 99.9 to 80 parts by mass of the polyamide (X).

6. The process of claim 5, wherein, in (b1), 94 to 98 parts by mass of the polyamide (X) and 6 to 2 parts by mass of the alkali compound (A) are molten and kneaded.

7. The process of claim 5, wherein, in (b2), 1 to 5 parts by mass of the polyamide master batch (Y) and 99 to 95 parts by mass of the polyamide (X) are molten and kneaded.

8. The process according to claim 1, wherein the alkali compound (A) is sodium acetate.

9. The process according to claim 1, wherein the phosphorus atom-containing compound (B) is at least one selected from the group consisting of hypophosphorous acid compounds and phosphorous acid compounds.

10. The process according to claim 1, wherein the alkali compound (A) is sodium acetate trihydrate.

11. The process according to claim 1, wherein the alkali compound (A) is sodium carbonate decahydrate.

12. The process according to claim 1, wherein the alkali compound (A) is lithium acetate dihydrate.

13. The process according to claim 1, wherein the alkali compound (A) is potassium acetate.

* * * * *